US012621776B2

(12) United States Patent
Yuan et al.

(10) Patent No.: US 12,621,776 B2
(45) Date of Patent: May 5, 2026

(54) TECHNIQUES FOR DETERMINING BEAM METRICS FOR MAXIMUM PERMISSIBLE EXPOSURE REPORTING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 524 days.

(21) Appl. No.: 17/758,275

(22) PCT Filed: Feb. 11, 2020

(86) PCT No.: PCT/CN2020/074690
§ 371 (c)(1),
(2) Date: Jun. 30, 2022

(87) PCT Pub. No.: WO2021/159266
PCT Pub. Date: Aug. 19, 2021

(65) Prior Publication Data
US 2023/0018795 A1 Jan. 19, 2023

(51) Int. Cl.
*H04W 52/36* (2009.01)
*H04B 1/3827* (2015.01)
(Continued)

(52) U.S. Cl.
CPC ........ *H04W 52/365* (2013.01); *H04B 1/3838* (2013.01); *H04W 52/146* (2013.01); *H04W 52/245* (2013.01)

(58) Field of Classification Search
CPC ... H04W 52/04; H04W 52/146; H04W 52/18; H04W 52/30; H04B 1/3827; H04B 1/3833; H04B 1/3838; H04B 7/0695
See application file for complete search history.

(56) References Cited

U.S. PATENT DOCUMENTS 10,462,755 B2 10/2019 Akkarakaran et al.
10,686,504 B2 * 6/2020 Li ........................ H04W 72/21
(Continued)

FOREIGN PATENT DOCUMENTS

CN 109088661 A 12/2018
WO WO-2018111844 A1 6/2018
(Continued)

OTHER PUBLICATIONS

Supplementary European Search Report—EP20918405—Search Authority—Munich—Jan. 8, 2024.
(Continued)

*Primary Examiner* — Quochien B Vuong
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine one or more beam metric values for one or more beams that are monitored by the UE, wherein the one or more beam metric values correspond to one or more of a beam power management maximum power reduction (P-MPR) metric, a beam uplink reference signal receive power (RSRP) metric, or a beam virtual power headroom metric; and transmit a report based at least in part on the one or more beam metric values. Numerous other aspects are provided.

35 Claims, 12 Drawing Sheets

(51) Int. Cl.
  H04W 52/14 (2009.01)
  H04W 52/24 (2009.01)

(56) References Cited

U.S. PATENT DOCUMENTS

| | | | | |
|---|---|---|---|---|
| 11,923,945 | B2 * | 3/2024 | Koskela | H04B 7/0695 |
| 2018/0115957 | A1 | 4/2018 | Lin et al. | |
| 2018/0132197 | A1 | 5/2018 | Lin et al. | |
| 2019/0141643 | A1 | 5/2019 | Molavianjazi et al. | |
| 2019/0313393 | A1 * | 10/2019 | Wang | H04B 17/309 |
| 2019/0335402 | A1 | 10/2019 | Zhang | |
| 2020/0344614 | A1 | 10/2020 | Takano | |
| 2021/0021325 | A1 * | 1/2021 | Davydov | H04B 7/0695 |
| 2022/0167335 | A1 * | 5/2022 | Go | H04W 52/146 |

FOREIGN PATENT DOCUMENTS

| | | |
|---|---|---|
| WO | WO-2018175002 A1 | 9/2018 |
| WO | WO-2018232127 A1 | 12/2018 |
| WO | 2019093014 A1 | 5/2019 |
| WO | 2019193419 A2 | 10/2019 |
| WO | 2019193581 A2 | 10/2019 |

OTHER PUBLICATIONS

Intel Corporation: "Solution Enhancements to Mitigate Link Failures in FR2", 3GPP Draft, 3GPP RAN4 WG Meeting #92Bis, R4-1912287—Solution Enhancements to Mitigate Link Failures in FR2, 3rd Generation Partnership Project (3GPP), Mobile Competence Centre, 650, Route Des Lucioles, F-06921 Sophia-Antipolis, vol. RAN WG4, No. Chongqing, China, Oct. 14, 2019-Oct. 18, 2019, Oct. 4, 2019 (Oct. 4, 2019), XP051807017, pp. 1-3, section 2.2.2 Beam failure reporting, p. 2.
Supplementary Partial European Search Report—EP20918405—Search Authority—Munich—Oct. 4, 2023.
International Search Report and Written Opinion—PCT/CN2020/074690—ISA/EPO—Nov. 13, 2020.
Qualcomm Incorporated: "Enhancements on Multi-Beam Operation", 3GPP Draft, 3GPP TSG-RAN WG1 Meeting #97, R1-1907290 Enhancements on Multi-beam Operation, 3rd Generation Partnership Project (3GPP), Mobile Competence Centre, 650, Route Des Lucioles, F-06921 Sophia-Anti Polis Cedex, France, vol. RAN WG1, No. Reno, USA, May 13, 2019-May 17, 2019, May 13, 2019 (May 13, 2019), XP051728730, XP051709313, pp. 1-26, Retrieved from the Internet: URL: http://www.3gpp.org/ftp/Meetings%5F3GPP%5FSYNC/RAN1/Docs/R1%2D1907290%2Ezip, http://www.3gpp.org/ftp/Meetings%5F3GPP%5FSYNC/RAN1/Docs/R1%2D1907290%2Ezip, [retrieved on May 13, 2019], Sections 2-8, Sections 1, 6, 8.2 and 8.4, p. 11, paragraph 1-paragraph 2.
ZTE: "Enhancement on FR2 MPE Mitigation", 3GPP Draft, 3GPP TSG RAN WG4 Meeting #93, R4-1913920, Nov. 18-22, 2019 (Nov. 22, 2019), 4 Pages, See Sections 2-3, Sections 1-3.
ZTE: "Enhancement on FR2 MPE Mitigation", 3GPP TSG RAN WG1 Meeting #99, R1-1911943, Reno, US, Nov. 18-22, 2019, 3 Pages, Nov. 18, 2019 (Nov. 18, 2019) The Whole Document.

* cited by examiner

400

```
┌─────────────┐                          ┌─────────────┐
│     UE      │                          │     gNB     │
└─────────────┘                          └─────────────┘
       │                                        │
┌──────────────────┐                            │
│       410        │                            │
│ Determine beam   │                            │
│ metric value(s)  │                            │
│ for monitored    │                            │
│    beam(s)       │                            │
└──────────────────┘                            │
       │                                        │
┌──────────────────┐                            │
│       420        │                            │
│ Identify a       │                            │
│ maximum          │                            │
│ permissible      │                            │
│ exposure (MPE)   │                            │
│ event            │                            │
└──────────────────┘                            │
       │                                        │
┌──────────────────┐          440               │
│       430        │  Transmit a report         │
│ Determine to     │                            │
│ beam switch      │───────────────────────────►│
└──────────────────┘                            │
       │                                        │
┌──────────────────┐                            │
│       450        │                            │
│ Beam switch      │                            │
└──────────────────┘                            │
       │                                        │
       ▼                                        ▼
```

Figure 6:
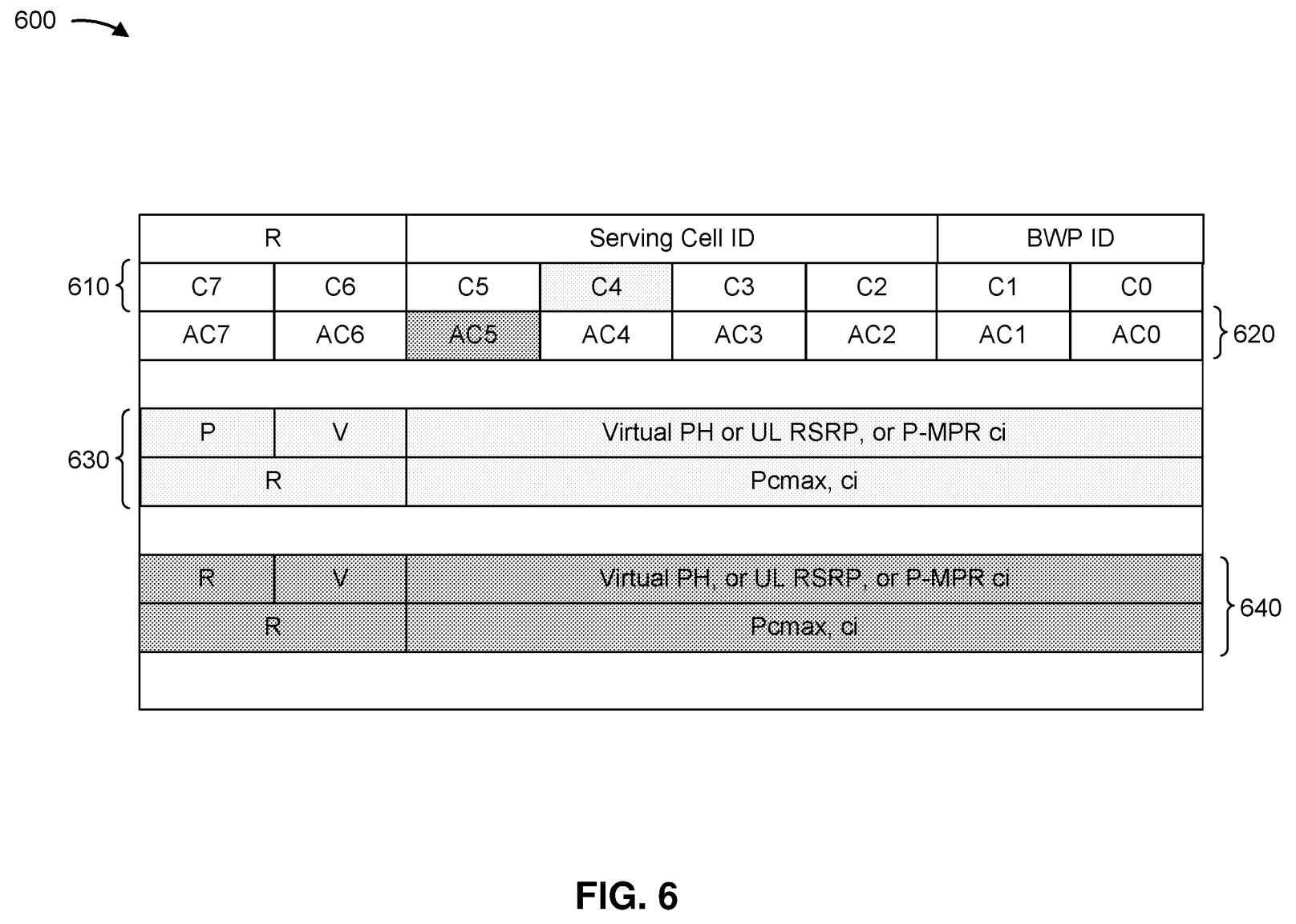

| Serving Cell ID | | | | | | | R | BWP ID | |
|---|---|---|---|---|---|---|---|---|---|
| C7 | C6 | C5 | C4 | C3 | C2 | C1 | C0 | | |
| AC7 | AC6 | AC5 | AC4 | AC3 | AC2 | AC1 | AC0 | | |

610

| P | V | Virtual PH or UL RSRP, or P-MPR ci |
|---|---|---|
| R | | Pcmax, ci |

630

620

| R | V | Virtual PH or UL RSRP, or P-MPR ci |
|---|---|---|
| | R | Pcmax, ci |

| | | | Serving Cell | | | | BWP ID | |
|---|---|---|---|---|---|---|---|---|
| R | | | | | | | | |
| AC7 | AC6 | AC5 | AC4 | AC3 | AC2 | AC1 | AC0 | |
| P | V | | Virtual PH or UL RSRP, or P-MPR ci | | | | | |
| R | | | Pcmax aci | | | | | |

| R | Serving Cell ID | | | | | | BWP ID | |
|---|---|---|---|---|---|---|---|---|
| C7 | C6 | C5 | C4 | C3 | C2 | C1 | C0 |
| P | V | Virtual PH or UL RSRP, or P-MPR $c_i$ | | | | | | |
| | R | Pcmax, $c_i$ | | | | | | |

| R | C7 | C6 | C5 | C4 | C3 | C2 | C1 | C0 |
|---|---|---|---|---|---|---|---|---|
| | | Serving Cell ID | | | | | BWP ID | |
| P | | V1 | | Virtual PH or UL RSRP | | | | |
| V2 | | | | Pcmax, ci | | | | |
| R | | R | | P-MPR ci | | | | |

FIG. 9

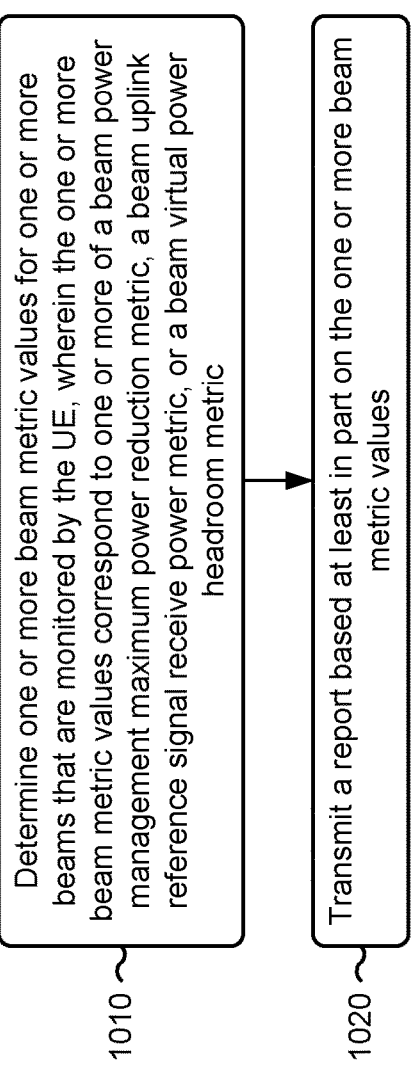

1010 Determine one or more beam metric values for one or more beams that are monitored by the UE, wherein the one or more beam metric values correspond to one or more of a beam power management maximum power reduction metric, a beam uplink reference signal receive power metric, or a beam virtual power headroom metric 1020 Transmit a report based at least in part on the one or more beam metric values

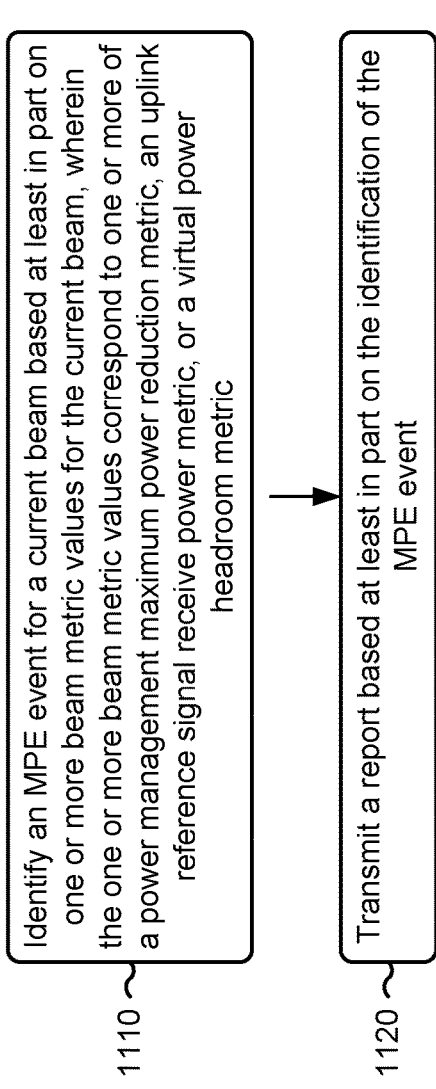

1110 Identify an MPE event for a current beam based at least in part on one or more beam metric values for the current beam, wherein the one or more beam metric values correspond to one or more of a power management maximum power reduction metric, an uplink reference signal receive power metric, or a virtual power headroom metric 1120 Transmit a report based at least in part on the identification of the MPE event

TECHNIQUES FOR DETERMINING BEAM METRICS FOR MAXIMUM PERMISSIBLE EXPOSURE REPORTING

CROSS-REFERENCE TO RELATED APPLICATION

This application is a 371 national stage of Patent Cooperation Treaty (PCT) Application No. PCT/CN2020/074690 filed on Feb. 11, 2020, entitled "TECHNIQUES FOR DETERMINING BEAM METRICS FOR MAXIMUM PERMISSIBLE EXPOSURE REPORTING," which is hereby expressly incorporated by reference herein.

FIELD OF THE DISCLOSURE

Aspects of the present disclosure generally relate to wireless communication and to techniques and apparatuses for techniques for determining beam metrics for maximum permissible exposure reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining one or more beam metric values for one or more beams that are monitored by the UE, wherein the one or more beam metric values correspond to one or more of a beam power management maximum power reduction (P-MPR) metric, a beam uplink reference signal receive power (RSRP) metric, or a beam virtual power headroom metric, and transmitting a report based at least in part on the one or more beam metric values.

In some aspects, the one or more beam metric values correspond to the uplink RSRP metric and the uplink RSRP metric is based at least in part on a beam P-MPR metric.

In some aspects, the one or more beam metric values correspond to the beam virtual power headroom metric, and the beam virtual power headroom metric is based at least in part on a beam P-MPR metric.

In some aspects, the method includes calculating a value for the beam virtual power headroom metric for a beam, of the one or more beams, based at least in part on an uplink resource, or an uplink resource configuration, associated with the beam.

In some aspects, the beam virtual power headroom metric for a beam is based at least in part on a difference between a maximum power available for a transmission via an uplink resource, or an uplink resource configuration, associated with the beam, and a current transmission power setting for a transmission via the uplink resource associated with the beam.

In some aspects, the maximum power available for the transmission via the uplink resource is based at least in part on a beam P-MPR metric for the beam.

In some aspects, the current transmission power setting for the transmission via the uplink resource associated with the beam is based at least in part on a set of power control parameters including one or more of pathloss, P0, alpha, or a reference target power.

In some aspects, the uplink resource comprises a physical uplink control channel (PUCCH), a physical uplink shared channel (PUSCH), or a sounding reference signal (SRS).

In some aspects, the uplink resource configuration includes one or more of information relating to a pathloss reference signal, information relating to a power control loop, p0, alpha, or information relating to the beam.

In some aspects, the UE transmits the report in one or more of a medium access control control element (MAC-CE) message, or an uplink beam report.

In some aspects, the report comprises at least one beam identification associated with the one or more beam metric values.

In some aspects, a beam identification of the at least one beam identification includes an uplink beam identification, a spatial reference signal identification, or an uplink resource identifier.

In some aspects, the report includes an uplink beam identification, a spatial reference signal identification, or an uplink resource identifier.

In some aspects, the report includes one or more of an indication of an uplink resource associated with a current beam of the one or more beams, and at least one beam metric value, of the one or more beam metric values, for the uplink resource associated with the current beam.

In some aspects, the at least one beam metric value for the uplink resource associated with the current beam comprises a value for the beam virtual power headroom metric.

In some aspects, the report includes an indication of an uplink resource associated with a candidate beam of the one or more beams, and at least one beam metric value, of the one or more beam metric values, for the uplink resource associated with the candidate beam.

In some aspects, the report comprises an indication of metric types, associated with the at least one beam metric value for the uplink resource associated with the candidate beam, that are included in the report.

In some aspects, the at least one beam metric value for the uplink resource associated with the candidate beam comprises a value for the beam virtual power headroom metric.

In some aspects, the report includes an indication of an uplink resource associated with an additional current beam of the one or more beams, and at least one beam metric value, of the one or more beam metric values, for the uplink resource associated with the additional current beam.

In some aspects, the report includes an indication of an uplink resource associated with an additional candidate beam of the one or more beams, and at least one beam metric value, of the one or more beam metric values, for the uplink resource associated with the additional candidate beam.

In some aspects, the at least one beam metric value for the uplink resource associated with the current beam includes a value for the beam P-MPR metric, a value of a maximum power available for a transmission via the uplink resource associated with the current beam, and one or more of a value for the beam virtual power headroom metric, or a value for the uplink RSRP metric.

In some aspects, the report includes a value for the beam P-MPR metric, a value of a maximum power available for a transmission via the uplink resource associated with the current beam, and one or more of a value for the beam virtual power headroom metric, or a value for the uplink RSRP metric.

In some aspects, the report includes one or more of an indication of an uplink resource associated with a candidate beam of the one or more beams, and one or more beam metric values, of the one or more beam metric values, for the uplink resource associated with the candidate beam.

In some aspects, the at least one beam metric value for the uplink resource associated with the candidate beam includes a value for the beam virtual power headroom metric.

In some aspects, a method of wireless communication, performed by a UE, may include identifying a maximum permissible exposure (MPE) event for a current beam based at least in part on one or more beam metric values for the current beam, wherein the one or more beam metric values correspond to one or more of a P-MPR metric, an uplink RSRP metric, or a virtual power headroom metric, and transmitting a report based at least in part on the identification of the MPE event.

In some aspects, the UE is configured with a first set of uplink resources associated with one or more current beams including the current beam and the UE is configured with one or more of a second set of uplink resources for candidate beams, or a third set of uplink resources for reporting beam metrics.

In some aspects, the first set of uplink resources, the second set of uplink resources, and the third set of uplink resources include one or more of an SRS, a PUCCH, a PUSCH, or a radio resource control (RRC) configuration.

In some aspects, the method includes identifying the MPE event for the current beam based at least in part on at least one beam metric value, of the one or more beam metric values, associated with the first set of uplink resources.

In some aspects, the method includes identifying, based at least in part on one or more beam metric values of the second set of uplink resources, a replacement beam for the current beam.

In some aspects, the method includes determining to beam switch from the current beam to the replacement beam based at least in part on the one or more beam metric values for the current beam and one or more beam metric values of the replacement beam.

In some aspects, the one or more beam metric values of the current beam and the one or more beam metric values of the replacement beam are based at least in part on multiple measurements of one or more beam metrics.

In some aspects, the determination to beam switch from the current beam to the replacement beam is based at least in part on the one or more beam metric values of the current beam failing to satisfy a first threshold, and the one or more beam metric values of the replacement beam satisfying a second threshold.

In some aspects, the determination to beam switch from the current beam to the replacement beam is based at least in part on a difference between the one or more beam metric values of the replacement beam and the one or more beam metric values of the current beam satisfying a threshold.

In some aspects, the method includes beam switch from the current beam to the replacement beam.

In some aspects, the report based at least in part on the identification of the MPE event identifies one or more of the current beam, the replacement beam, the one or more beam metric values for the current beam, or the one or more beam metric values of the replacement beam.

In some aspects, a UE for wireless communication may include memory and one or more processors operatively coupled to the memory. The memory and the one or more processors may be configured to determine one or more beam metric values for one or more beams that are monitored by the UE, wherein the one or more beam metric values correspond to one or more of a beam P-MPR metric, a beam uplink RSRP metric, or a beam virtual power headroom metric, and transmit a report based at least in part on the one or more beam metric values.

In some aspects, the one or more beam metric values correspond to the uplink RSRP metric and the uplink RSRP metric is based at least in part on a beam P-MPR metric.

In some aspects, the one or more beam metric values correspond to the beam virtual power headroom metric and the beam virtual power headroom metric is based at least in part on a beam P-MPR metric.

In some aspects, the method includes calculating a value for the beam virtual power headroom metric for a beam, of the one or more beams, based at least in part on an uplink resource, or an uplink resource configuration, associated with the beam.

In some aspects, the beam virtual power headroom metric for a beam is based at least in part on a difference between a maximum power available for a transmission via an uplink resource, or an uplink resource configuration, associated with the beam and a current transmission power setting for a transmission via the uplink resource associated with the beam.

In some aspects, the maximum power available for the transmission via the uplink resource is based at least in part on a beam P-MPR metric for the beam.

In some aspects, the current transmission power setting for the transmission via the uplink resource associated with the beam is based at least in part on a set of power control parameters including one or more of pathloss, P0, alpha, or a reference target power.

In some aspects, the uplink resource comprises a PUCCH, a PUSCH, or an SRS.

In some aspects, the uplink resource configuration includes one or more of information relating to a pathloss reference signal, information relating to a power control loop, p0, alpha, or information relating to the beam.

In some aspects, the UE transmits the report in one or more of a MAC-CE message, or an uplink beam report.

In some aspects, the report comprises at least one beam identification associated with the one or more beam metric values.

In some aspects, a beam identification of the at least one beam identification includes an uplink beam identification, a spatial reference signal identification, or an uplink resource identifier.

In some aspects, the report includes an uplink beam identification, a spatial reference signal identification, or an uplink resource identifier.

In some aspects, the report includes one or more of an indication of an uplink resource associated with a current beam of the one or more beams, and at least one beam metric value, of the one or more beam metric values, for the uplink resource associated with the current beam.

In some aspects, the at least one beam metric value for the uplink resource associated with the current beam comprises a value for the beam virtual power headroom metric.

In some aspects, the report includes an indication of an uplink resource associated with a candidate beam of the one or more beams, and at least one beam metric value, of the one or more beam metric values, for the uplink resource associated with the candidate beam.

In some aspects, the report comprises an indication of metric types, associated with the at least one beam metric value for the uplink resource associated with the candidate beam, that are included in the report.

In some aspects, the at least one beam metric value for the uplink resource associated with the candidate beam comprises a value for the beam virtual power headroom metric.

In some aspects, the report includes an indication of an uplink resource associated with an additional current beam of the one or more beams, and at least one beam metric value, of the one or more beam metric values, for the uplink resource associated with the additional current beam.

In some aspects, the report includes an indication of an uplink resource associated with an additional candidate beam of the one or more beams, and at least one beam metric value, of the one or more beam metric values, for the uplink resource associated with the additional candidate beam.

In some aspects, the at least one beam metric value for the uplink resource associated with the current beam includes a value for the beam P-MPR metric, a value of a maximum power available for a transmission via the uplink resource associated with the current beam, and one or more of a value for the beam virtual power headroom metric, or a value for the uplink RSRP metric.

In some aspects, the report includes a value for the beam P-MPR metric, a value of a maximum power available for a transmission via the uplink resource associated with the current beam, and one or more of a value for the beam virtual power headroom metric, or a value for the uplink RSRP metric.

In some aspects, the report includes one or more of an indication of an uplink resource associated with a candidate beam of the one or more beams, and one or more beam metric values, of the one or more beam metric values, for the uplink resource associated with the candidate beam.

In some aspects, the at least one beam metric value for the uplink resource associated with the candidate beam includes a value for the beam virtual power headroom metric.

In some aspects, a UE for wireless communication may include memory and one or more processors operatively coupled to the memory. The memory and the one or more processors may be configured to identify an MPE event for a current beam based at least in part on one or more beam metric values for the current beam, wherein the one or more beam metric values correspond to one or more of a P-MPR metric, an uplink RSRP metric, or a virtual power headroom metric, and transmit a report based at least in part on the identification of the MPE event.

In some aspects, the UE is configured with a first set of uplink resources associated with one or more current beams including the current beam, and the UE is configured with one or more of a second set of uplink resources for candidate beams, or a third set of uplink resources for reporting beam metrics.

In some aspects, the first set of uplink resources, the second set of uplink resources, and the third set of uplink resources include one or more of an SRS, a PUCCH, a PUSCH, or an RRC configuration.

In some aspects, the one or more processors may be configured to identify the MPE event for the current beam based at least in part on at least one beam metric value, of the one or more beam metric values, associated with the first set of uplink resources.

In some aspects, the one or more processors may be configured to identify, based at least in part on one or more beam metric values of the second set of uplink resources, a replacement beam for the current beam.

In some aspects, the one or more processors may be configured to determine to beam switch from the current beam to the replacement beam based at least in part on the one or more beam metric values for the current beam and one or more beam metric values of the replacement beam.

In some aspects, the one or more beam metric values of the current beam and the one or more beam metric values of the replacement beam are based at least in part on multiple measurements of one or more beam metrics.

In some aspects, the determination to beam switch from the current beam to the replacement beam is based at least in part on the one or more beam metric values of the current beam failing to satisfy a first threshold, and the one or more beam metric values of the replacement beam satisfying a second threshold.

In some aspects, the determination to beam switch from the current beam to the replacement beam is based at least in part on a difference between the one or more beam metric values of the replacement beam and the one or more beam metric values of the current beam satisfying a threshold.

In some aspects, the one or more processors may be configured to beam switch from the current beam to the replacement beam.

In some aspects, the report based at least in part on the identification of the MPE event identifies one or more of the current beam, the replacement beam, the one or more beam metric values for the current beam, or the one or more beam metric values of the replacement beam.

In some aspects, a non-transitory computer-readable medium may store one or more instructions for wireless communication. The one or more instructions, when executed by one or more processors of a UE, may cause the one or more processors to determine one or more beam metric values for one or more beams that are monitored by the UE, wherein the one or more beam metric values correspond to one or more of a beam P-MPR metric, a beam uplink RSRP metric, or a beam virtual power headroom metric, and transmit a report based at least in part on the one or more beam metric values.

In some aspects, the one or more beam metric values correspond to the uplink RSRP metric, and the uplink RSRP metric is based at least in part on a beam P-MPR metric.

In some aspects, the one or more beam metric values correspond to the beam virtual power headroom metric, and the beam virtual power headroom metric is based at least in part on a beam P-MPR metric.

In some aspects, the method includes calculating a value for the beam virtual power headroom metric for a beam, of the one or more beams, based at least in part on an uplink resource, or an uplink resource configuration, associated with the beam.

In some aspects, the beam virtual power headroom metric for a beam is based at least in part on a difference between a maximum power available for a transmission via an uplink resource, or an uplink resource configuration, associated with the beam, and a current transmission power setting for a transmission via the uplink resource associated with the beam.

In some aspects, the maximum power available for the transmission via the uplink resource is based at least in part on a beam P-MPR metric for the beam.

In some aspects, the current transmission power setting for the transmission via the uplink resource associated with the beam is based at least in part on a set of power control parameters including one or more of pathloss, P0, alpha, or a reference target power.

In some aspects, the uplink resource comprises a PUCCH, a PUSCH, or an SRS.

In some aspects, the uplink resource configuration includes one or more of information relating to a pathloss reference signal, information relating to a power control loop, p0, alpha, or information relating to the beam.

In some aspects, the UE transmits the report in one or more of a MAC-CE message, or an uplink beam report.

In some aspects, the report comprises at least one beam identification associated with the one or more beam metric values.

In some aspects, a beam identification of the at least one beam identification includes an uplink beam identification, a spatial reference signal identification, or an uplink resource identifier.

In some aspects, the report includes an uplink beam identification, a spatial reference signal identification, or an uplink resource identifier.

In some aspects, the report includes one or more of an indication of an uplink resource associated with a current beam of the one or more beams, and at least one beam metric value, of the one or more beam metric values, for the uplink resource associated with the current beam.

In some aspects, the at least one beam metric value for the uplink resource associated with the current beam comprises a value for the beam virtual power headroom metric.

In some aspects, the report includes an indication of an uplink resource associated with a candidate beam of the one or more beams, and at least one beam metric value, of the one or more beam metric values, for the uplink resource associated with the candidate beam.

In some aspects, the report comprises an indication of metric types, associated with the at least one beam metric value for the uplink resource associated with the candidate beam, that are included in the report.

In some aspects, the at least one beam metric value for the uplink resource associated with the candidate beam comprises a value for the beam virtual power headroom metric.

In some aspects, the report comprises an indication of an uplink resource associated with an additional current beam of the one or more beams, and at least one beam metric value, of the one or more beam metric values, for the uplink resource associated with the additional current beam.

In some aspects, the report includes an indication of an uplink resource associated with an additional candidate beam of the one or more beams, and at least one beam metric value, of the one or more beam metric values, for the uplink resource associated with the additional candidate beam.

In some aspects, the at least one beam metric value for the uplink resource associated with the current beam includes a value for the beam P-MPR metric, a value of a maximum power available for a transmission via the uplink resource associated with the current beam, and one or more of a value for the beam virtual power headroom metric, or a value for the uplink RSRP metric.

In some aspects, the report includes a value for the beam P-MPR metric, a value of a maximum power available for a transmission via the uplink resource associated with the current beam, and one or more of a value for the beam virtual power headroom metric, or a value for the uplink RSRP metric.

In some aspects, the report includes one or more of an indication of an uplink resource associated with a candidate beam of the one or more beams, and one or more beam metric values, of the one or more beam metric values, for the uplink resource associated with the candidate beam.

In some aspects, the at least one beam metric value for the uplink resource associated with the candidate beam includes a value for the beam virtual power headroom metric.

In some aspects, a non-transitory computer-readable medium may store one or more instructions for wireless communication. The one or more instructions, when executed by one or more processors of a UE, may cause the one or more processors to identify an MPR event for a current beam based at least in part on one or more beam metric values for the current beam, wherein the one or more beam metric values correspond to one or more of a P-MPR metric, an uplink RSRP metric, or a virtual power headroom metric, and transmit a report based at least in part on the identification of the MPE event.

In some aspects, the UE is configured with a first set of uplink resources associated with one or more current beams including the current beam, and the UE is configured with one or more of a second set of uplink resources for candidate beams, or a third set of uplink resources for reporting beam metrics.

In some aspects, the first set of uplink resources, the second set of uplink resources, and the third set of uplink resources include one or more of an SRS, a PUCCH, a PUSCH, or an RRC configuration.

In some aspects, the one or more instructions, when executed by one or more processors of a UE, cause the one or more processors to identify the MPE event for the current beam based at least in part on at least one beam metric value, of the one or more beam metric values, associated with the first set of uplink resources.

In some aspects, the one or more instructions, when executed by one or more processors of a UE, cause the one or more processors to identify, based at least in part on one or more beam metric values of the second set of uplink resources, a replacement beam for the current beam.

In some aspects, the one or more instructions, when executed by one or more processors of a UE, cause the one or more processors to determine to beam switch from the current beam to the replacement beam based at least in part on the one or more beam metric values for the current beam and one or more beam metric values of the replacement beam.

In some aspects, the one or more beam metric values of the current beam and the one or more beam metric values of the replacement beam are based at least in part on multiple measurements of one or more beam metrics.

In some aspects, the determination to beam switch from the current beam to the replacement beam is based at least in part on the one or more beam metric values of the current beam failing to satisfy a first threshold, and the one or more beam metric values of the replacement beam satisfying a second threshold.

In some aspects, the determination to beam switch from the current beam to the replacement beam is based at least in part on a difference between the one or more beam metric values of the replacement beam and the one or more beam metric values of the current beam satisfying a threshold.

In some aspects, the one or more instructions, when executed by one or more processors of a UE, cause the one or more processors to beam switch from the current beam to the replacement beam.

In some aspects, the report based at least in part on the identification of the MPE event identifies one or more of the current beam, the replacement beam, the one or more beam metric values for the current beam, or the one or more beam metric values of the replacement beam.

In some aspects, an apparatus for wireless communication may include means for determining one or more beam metric values for one or more beams that are monitored by the apparatus, wherein the one or more beam metric values correspond to one or more of a beam P-MPR metric, a beam uplink RSRP metric, or a beam virtual power headroom metric, and means for transmitting a report based at least in part on the one or more beam metric values.

In some aspects, the one or more beam metric values correspond to the uplink RSRP metric, and the uplink RSRP metric is based at least in part on a beam P-MPR metric.

In some aspects, the one or more beam metric values correspond to the beam virtual power headroom metric, and the beam virtual power headroom metric is based at least in part on a beam P-MPR metric.

In some aspects, the apparatus includes means for calculating a value for the beam virtual power headroom metric for a beam, of the one or more beams, based at least in part on an uplink resource, or an uplink resource configuration, associated with the beam.

In some aspects, the beam virtual power headroom metric for a beam is based at least in part on a difference between a maximum power available for a transmission via an uplink resource, or an uplink resource configuration, associated with the beam and a current transmission power setting for a transmission via the uplink resource associated with the beam.

In some aspects, the maximum power available for the transmission via the uplink resource is based at least in part on a beam P-MPR metric for the beam.

In some aspects, the current transmission power setting for the transmission via the uplink resource associated with the beam is based at least in part on a set of power control parameters including one or more of pathloss, P0, alpha, or a reference target power.

In some aspects, the uplink resource comprises a PUCCH, a PUSCH, or an SRS.

In some aspects, the uplink resource configuration includes one or more of information relating to a pathloss reference signal, information relating to a power control loop, p0, alpha, or information relating to the beam.

In some aspects, the apparatus transmits the report in one or more of a MAC-CE message, or an uplink beam report.

In some aspects, the report comprises at least one beam identification associated with the one or more beam metric values.

In some aspects, a beam identification of the at least one beam identification includes an uplink beam identification, a spatial reference signal identification, or an uplink resource identifier.

In some aspects, the report includes an uplink beam identification, a spatial reference signal identification, or an uplink resource identifier.

In some aspects, the report includes one or more of an indication of an uplink resource associated with a current beam of the one or more beams, and at least one beam metric value, of the one or more beam metric values, for the uplink resource associated with the current beam.

In some aspects, the at least one beam metric value for the uplink resource associated with the current beam comprises a value for the beam virtual power headroom metric.

In some aspects, the report includes an indication of an uplink resource associated with a candidate beam of the one or more beams, and at least one beam metric value, of the one or more beam metric values, for the uplink resource associated with the candidate beam.

In some aspects, the report comprises an indication of metric types, associated with the at least one beam metric value for the uplink resource associated with the candidate beam, that are included in the report.

In some aspects, the at least one beam metric value for the uplink resource associated with the candidate beam comprises a value for the beam virtual power headroom metric.

In some aspects, the report includes an indication of an uplink resource associated with an additional current beam of the one or more beams, and at least one beam metric value, of the one or more beam metric values, for the uplink resource associated with the additional current beam.

In some aspects, the report includes an indication of an uplink resource associated with an additional candidate beam of the one or more beams, and at least one beam metric value, of the one or more beam metric values, for the uplink resource associated with the additional candidate beam.

In some aspects, the at least one beam metric value for the uplink resource associated with the current beam includes a value for the beam P-MPR metric, a value of a maximum power available for a transmission via the uplink resource associated with the current beam, and one or more of a value for the beam virtual power headroom metric, or a value for the uplink RSRP metric.

In some aspects, the report includes a value for the beam P-MPR metric, a value of a maximum power available for a transmission via the uplink resource associated with the current beam, and one or more of a value for the beam virtual power headroom metric, or a value for the uplink RSRP metric.

In some aspects, the report includes one or more of an indication of an uplink resource associated with a candidate beam of the one or more beams, and one or more beam metric values, of the one or more beam metric values, for the uplink resource associated with the candidate beam.

In some aspects, the at least one beam metric value for the uplink resource associated with the candidate beam includes a value for the beam virtual power headroom metric.

In some aspects, an apparatus for wireless communication may include means for identifying an MPR event for a current beam based at least in part on one or more beam metric values for the current beam, wherein the one or more beam metric values correspond to one or more of a P-MPR metric, an uplink RSRP metric, or a virtual power headroom metric, and means for transmitting a report based at least in part on the identification of the MPE event.

In some aspects, the apparatus is configured with a first set of uplink resources associated with one or more current beams including the current beam and the apparatus is configured with one or more of a second set of uplink resources for candidate beams, or a third set of uplink resources for reporting beam metrics.

In some aspects, the first set of uplink resources, the second set of uplink resources, and the third set of uplink resources include one or more of an SRS, a PUCCH, a PUSCH, or an RRC configuration.

In some aspects, the apparatus includes means for identifying the MPE event for the current beam based at least in part on at least one beam metric value, of the one or more beam metric values, associated with the first set of uplink resources.

In some aspects, the apparatus includes means for identifying, based at least in part on one or more beam metric values of the second set of uplink resources, a replacement beam for the current beam.

In some aspects, the apparatus includes means for determining to beam switch from the current beam to the replacement beam based at least in part on the one or more beam metric values for the current beam and one or more beam metric values of the replacement beam.

In some aspects, the one or more beam metric values of the current beam and the one or more beam metric values of the replacement beam are based at least in part on multiple measurements of one or more beam metrics.

In some aspects, the determination to beam switch from the current beam to the replacement beam is based at least in part on the one or more beam metric values of the current beam failing to satisfy a first threshold, and the one or more beam metric values of the replacement beam satisfying a second threshold.

In some aspects, the determination to beam switch from the current beam to the replacement beam is based at least in part on a difference between the one or more beam metric values of the replacement beam and the one or more beam metric values of the current beam satisfying a threshold.

In some aspects, the apparatus includes means for beam switch from the current beam to the replacement beam.

In some aspects, the report based at least in part on the identification of the MPE event identifies one or more of the current beam, the replacement beam, the one or more beam metric values for the current beam, or the one or more beam metric values of the replacement beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of reporting beam metric values and/or an MPE event report, in accordance with various aspects of the present disclosure.

FIG. 6 is a diagram illustrating an example report for beam metric values, in accordance with various aspects of the present disclosure.

FIG. 7 is a diagram illustrating an example report for beam metric values, in accordance with various aspects of the present disclosure.

FIG. 8 is a diagram illustrating an example report for beam metric values, in accordance with various aspects of the present disclosure.

FIG. 9 is a diagram illustrating an example report for beam metric values, in accordance with various aspects of the present disclosure.

FIG. 10 is a diagram illustrating an example process performed, for example, by a user equipment, in accordance with various aspects of the present disclosure.

FIG. 11 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
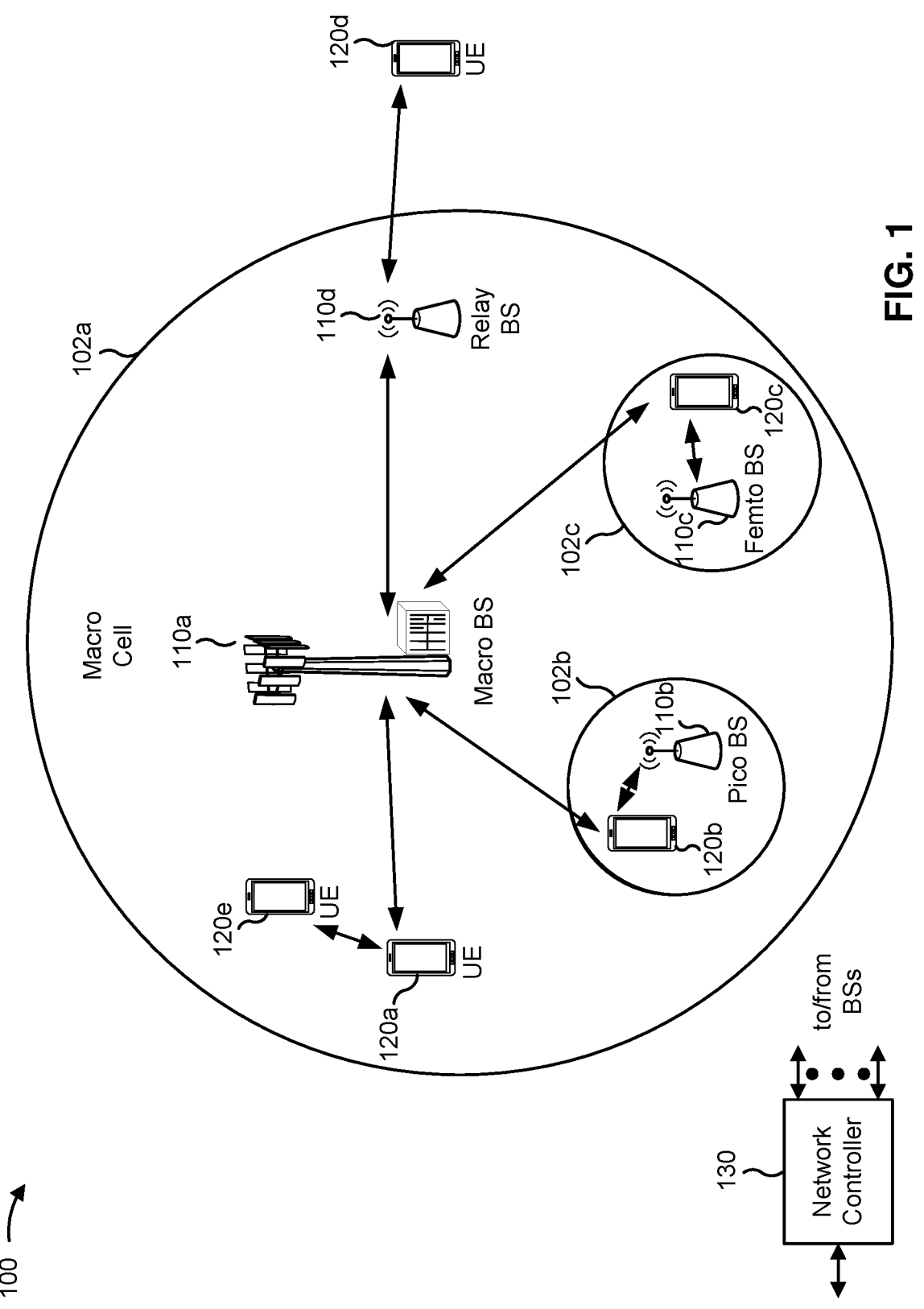
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
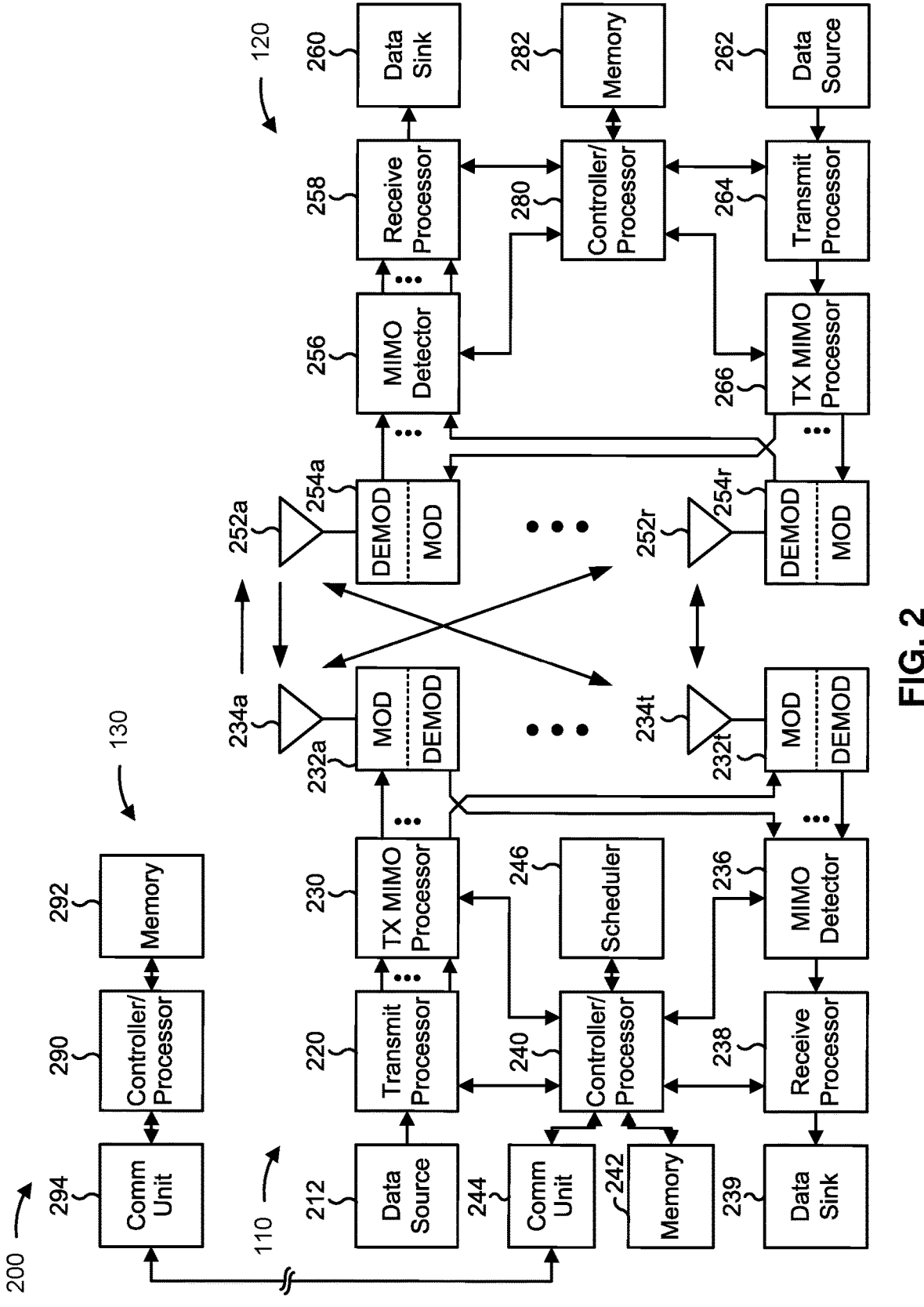
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with determining beam metrics for maximum permissible exposure reporting, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example process 1000 of FIG. 10, process 1100 of FIG. 11, and/or other processes as described herein. A scheduler 246 may schedule UEs for data transmission on the downlink and/or uplink.

In some aspects, UE 120 may include means for determining one or more beam metric values for one or more beams that are monitored by the UE, wherein the one or more beam metric values correspond to one or more of a beam P-MPR metric, a beam uplink RSRP metric, or a beam virtual power headroom metric; means for transmitting a report based at least in part on the one or more beam metric values, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for identifying an MPR event for a current beam based at least in part on one or more beam metric values for the current beam, wherein the one or more beam metric values correspond to one or more of a P-MPR metric, an uplink RSRP metric, or a virtual power headroom metric; means for transmitting a report based at least in part on the identification of the MPE event, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
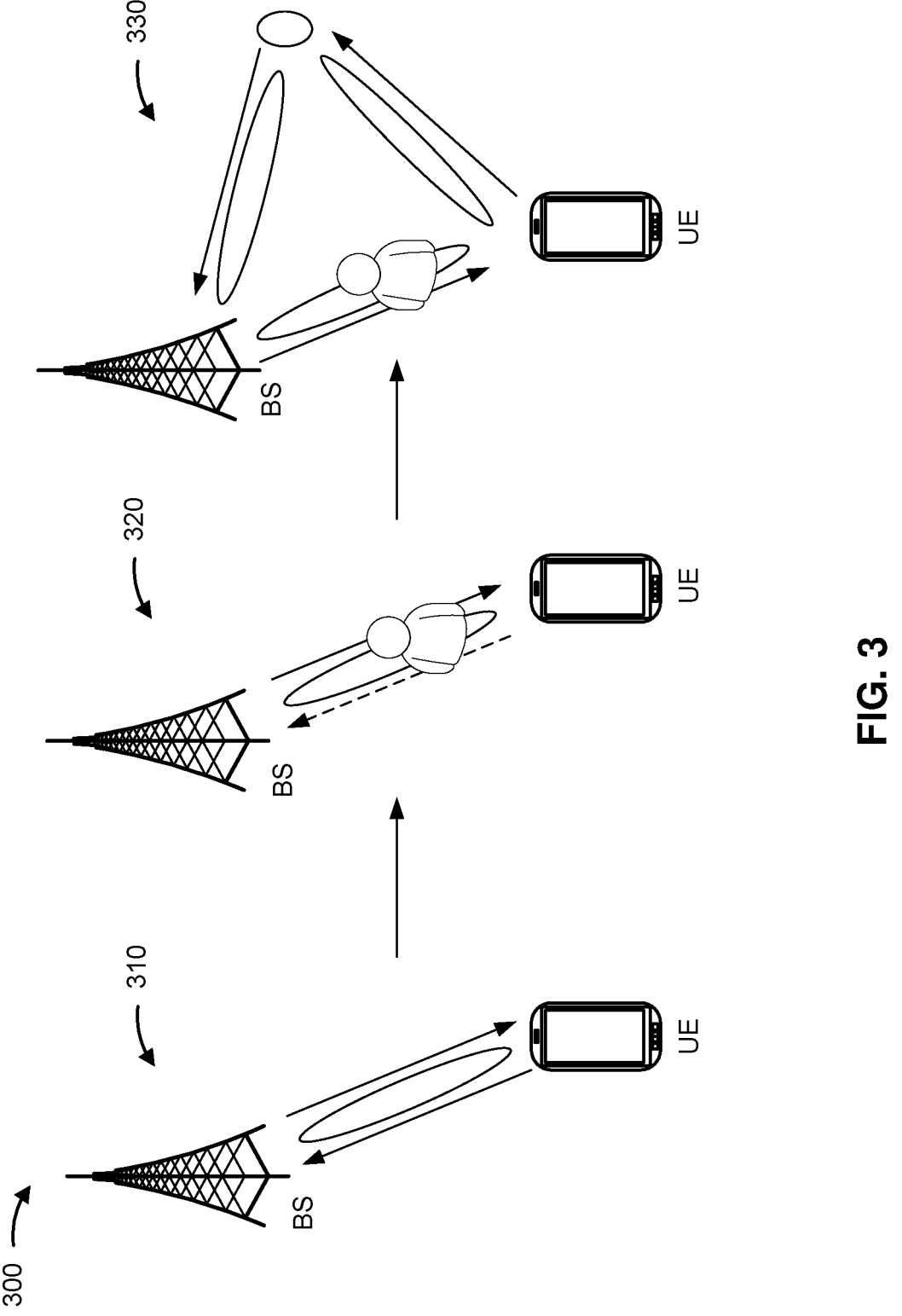
FIG. 3 is a diagram illustrating an example of identifying an MPE event associated with a beam, in accordance with various aspects of the present disclosure.

FIG. 3 is a diagram illustrating an example 300 of identifying an MPE event associated with a beam, in accordance with various aspects of the present disclosure.

As shown in FIG. 3, and by reference number 310, a UE and a base station may communicate using directional beams. In some wireless networks, a UE may communicate with a base station using directional beamforming to boost transmission power in one or more particular directions associated with one or more beams. By concentrating transmission power in one or more beams, an output energy associated with transmissions using the one or beams may be higher than if the UE performed an omni-directional transmission for the transmissions. This may increase a range of the transmissions, but may also cause an energy density of the transmission to satisfy (e.g., exceed) an MPE value that defines a highest energy density that is allowed to be exposed to a human body at close range. An MPE value may be defined via RRC configurations, for example, to comply with a standard and/or a regulation. The standard and/or regulation may have different limits for different frequency bandwidths. For example, a limit (e.g., corresponding to the MPE value) may be lower for millimeter wave (mmWave) transmissions than for sub-6 wave transmissions.

As shown by reference number 320, the UE may identify an MPE event. The UE may identify the MPE event based at least in part on detecting a part of a human body and/or other organic material at close range for the UE within a path of an uplink beam. Based at least in part on detecting a part of a human body in a direction of a beam for which transmissions would use an energy density that satisfies the MPE, the UE may reduce transmission power of one or more antennas that are associated with the beam. However, by reducing transmission power of the one or more antennas that are associated with the beam, the transmission may have insufficient power for the base station to receive the transmission. This may cause a beam failure.

As shown by reference number 330, the UE may resume communicating with the base station using a new beam for uplink communications. The new beam may be in a different direction from the beam associated with the MPE event.

As indicated above, FIG. 3 is provided as an example. Other examples may differ from what is described with regard to FIG. 3.

A UE may determine a maximum power output (e.g., $P(CMAX_{f,c})$) for a carrier f of a serving cell c. The maximum power output may be set so that a corresponding measured peak equivalent isotropically radiated power (EIRP) and $P(UMAX_{f,c})$ are within the following bounds:

$$P_{Powerclass} - \text{MAX}(\text{MAX}(MPR_{f,c}, A\text{-}MPR_{f,c}) + \Delta MBP_n, \\ P\text{-}MPR_{f,c}) - \text{MAX}\{T(\text{MAX}(MPR_{f,c}, A\text{-}MPR_{f,c})), T \\ (P\text{-}MPRf_{f,c})\} \leq PUMAX_{f,c} \leq EIRPmax \qquad \text{Equation 1}$$

In Equation 1, $MPR_{f,c}$, MPR is a maximum power reduction for a carrier f of a serving cell c, $A\text{-}MPR_{f,c}$ is an additional maximum power reduction for a carrier f of a serving cell c, $\Delta MBP_n$ is a peak EIRP relaxation, and $P\text{-}MPR_{f,c}$ is a power management maximum power reduction for a carrier f of a serving cell c. In some aspects, $P\text{-}MPR_{f,c}$ may be a maximum allowed output power reduction. The UE may apply $P\text{-}MPR_{f,c}$ for carrier f of serving cell c for one or more situations involving UE conformance testing. For example, the UE may apply $P\text{-}MPR_{f,c}$ for carrier f of serving cell c for compliance with applicable electromagnetic power density exposure requirements, addressing unwanted emissions, and/or self-defence requirements in cases of simultaneous transmissions on multiple radio access technologies for scenarios not in the scope of 3GPP RAN specifications. The UE may apply $P\text{-}MPR_{f,c}$ for carrier f of serving cell c for compliance with applicable electromagnetic power density exposure requirements in cases of proximity detection used to address such requirements that require a lower maximum output power (e.g., an MPR event). For UE conformance testing, $P\text{-}MPR_{f,c}$ may be 0 dB. The UE may use the $P\text{-}MPR_{f,c}$ to report an available maximum output transmit power. A base station may use the $P\text{-}MPR_{f,c}$ and/or a $P_{cmax,f,c}$ value for scheduling decisions. However, because the $P\text{-}MPR_{f,c}$ and/or the $P_{cmax,f,c}$ values correspond to a cell, the base station is not able to use the $P\text{-}MPR_{f,c}$ and/or the $P_{cmax,f,c}$ value for scheduling decisions regarding selecting beams for scheduling.

In some aspects disclosed herein, a UE (e.g., UE 120) may determine one or more beam metric values (e.g., metric values that are beam-specific) for one or more beams that are monitored by the UE. The one or more beam metric values may correspond to one or more of a P-MPR metric, a beam uplink RSRP metric, a beam virtual power headroom metric, a true power headroom metric, and/or the like. The virtual power head room may be calculated based at least in part on a reference format of uplink transmission, and the true power headroom metric may be calculated based at least in part on a real uplink transmission. In some aspects, the one or more beam metric values may be based at least in part on a value of a P-MPR metric. In some aspects, the UE may identify an MPR event based at least in part on the one or more beam metric values. In some aspects, the UE may transmit a report based at least in part on the one or more beam metric values and/or the identification of the MPE event. In this way, the UE may provide information for the base station to use for scheduling decisions including beam-specific scheduling decisions.

FIG. 4 is a diagram illustrating an example 400 of reporting beam metric values and/or an MPE event report, in accordance with various aspects of the present disclosure. As shown in FIG. 4, a UE (e.g., UE 120) may communicate with a base station (e.g., base station 110) to transmit a report based at least in part on one or more beam metric values and/or an identification of the MPE event. The UE and the base station may be part of a wireless network (e.g., wireless network 100).

As shown in FIG. 4, and by reference number 410, the UE may determine one or more beam metric values for one or more beams that are monitored by the UE. In some aspects, the one or more beam metric values may be associated with a transmission power of the UE for the one or more beams and/or a reception power for uplink signals. For example, the one or more beam metric values may correspond to a beam P-MPR metric (also referenced as a beam-specific P-MPR), a beam uplink RSRP metric, a beam virtual power headroom metric, and/or the like. In some aspects, the one or more beam metric values (e.g., the uplink RSRP metric value, the beam virtual power headroom metric value, and/or the like) may be based at least in part on a beam P-MPR metric value.

In some aspects, a beam virtual power headroom (PH) metric value for a beam (qs) may be calculated according to Equation 2:

$$PH_{qs} = \tilde{P}_{cmax,f,c}(i,qs) - \{P_{0_{UL,b,f,c}}(qs) + \alpha_{UL,b,f,c}(qs)^* \\ PL_{b,f,c}(qd) + h_{UL,b,f,c}(i,l)\} \qquad \text{Equation 2}$$

In Equation 2, $\tilde{P}_{cmax,f,c}$ (i, qs) may be a maximum power output at a time i that is uplink resource specific (e.g., based at least in part on the uplink resource being associated with a beam) or may be uplink resource configuration specific. In some aspects, $\tilde{P}_{cmax,f,c}$(i, qs) may be a value that is based at least in part on a period of time. For example, $\tilde{P}_{cmax,f,c}$(i, qs) may be an average of calculated $P_{cmax,f,c}$(i, qs) values over a period of time, a representative $\tilde{P}_{cmax,f,c}$(i, qs) value from the period of time, and/or the like. In some aspects, $P_{0_{UL,b,f,c}}$(qs) and $\alpha_{UL,b,f,c}$(qs) may be a P0 and an alpha value that are based at least on an identification of the uplink resource (e.g., a UL resource ID). $PL_{b,f,c}$(qd) may be a pathloss reference signal in a corresponding downlink resource associated with the uplink resource. In some aspects, a P0 value may represent a target received power, an alpha value may represent a compensation factor in a power control formula, and the pathloss reference signal may indicate an amount of pathloss (e.g., an amount of signal power lost during transmission to the base station). In some aspects, $h_{UL,b,f,c}$(i, l) may be an uplink power control adjustment state (e.g., a value may be 0 (zero), or $h_{UL,b,f,c}$(i, 0) if not configured or indicated) that is based at least in part on a power control loop (e.g., as indicated by the base station) associated with the uplink resource.

As shown in Equation 2, the beam virtual power headroom metric for a beam may be based at least in part on a difference between a maximum power available for a transmission via an uplink resource (e.g., $\tilde{P}_{cmax,f,c}$(i, qs)), or an uplink resource configuration, associated with the beam, and a current transmission power setting for a transmission via the uplink resource associated with the beam (e.g. $\{P_{0_{UL,b,f,c}}$(qs)+$\alpha_{UL,b,f,c}$(qs)$^*$PL$_{b,f,c}$(qd)+$h_{UL,b,f,c}$(i, l)$\}$) or a transmission power setting for an uplink resource configuration associated with the beam. In some aspects, the current transmission power setting for the transmission via the uplink resource associated with the beam may be based at least in part on a set of power control parameters including pathloss, P0, alpha, a reference target power, and/or the like. In some aspects, the uplink resource configuration may include information relating to a pathloss reference signal, information relating to a power control loop, p0, alpha, or information relating to the beam, and/or the like.

In some aspects, the UE may identify $\tilde{P}_{cmax,f,c}$(i, qs), $\alpha_{UL,b,f,c}$(qs), $PL_{b,f,c}$(qd), $h_{UL,b,f,c}$(i, l), and/or other power control parameters based at least in part on a configuration of the UE, within a communication from the base station, and/or the like. In some aspects, $\tilde{P}_{cmax,f,c}$(i, qs) may be based at least in part on a beam P-MPR for the uplink resource (e.g., based at least in part on an assumption that MPR may be 0 dB, A-MPR may be 0 dB, and P-MPR may be beam specific for the uplink resource). In some aspects, the UE may calculate a value for the beam virtual power headroom metric for a beam based at least in part on an uplink resource, or an uplink resource configuration, associated with the beam.

In some aspects, an uplink RSRP for a beam (qs) may be calculated according to Equation 3:

$$UL \ RSRP = \tilde{P}_{cmax,f,c}(i,qs) - PL_{b,f,c}(qd) \text{ or } = \\ \tilde{P}_{cmax,f,c}(i,qs) - \alpha_{UL,b,f,c}(qs)^* PL_{b,f,c}(qd) \qquad \text{Equation 3}$$

In Equation 3, the uplink RSRP is based at least in part on a difference between the maximum power available for a transmission via an uplink resource (e.g., $\tilde{P}_{cmax,f,c}$(i, qs)), or an uplink resource configuration, associated with the beam, and a pathloss value (e.g., $PL_{b,f,c}$(qd) or $\alpha_{UL,b,f,c}$(qs)$^*$ $PL_{b,f,c}$(qd)) for a transmission via the uplink resource associated with the beam. As described herein, the maximum power available for a transmission via the uplink resource may be based at least in part on a P-MPR for the uplink resource.

An uplink resource associated with the calculation of Equation 2 may be a PUCCH, a PUSCH, a sounding reference signal SRS, the uplink resource associated with a CSI-RS, and/or the like.

In some aspects, the UE may be configured with a first set of uplink resources associated with one or more current beams, a second set of uplink resources for candidate beams, a third set of uplink resources for reporting beam metrics, and/or the like. In some aspects, the first set of uplink resources, the second set of uplink resources, and/or the third set of uplink resources may include an SRS, a PUCCH, a PUSCH, the uplink resource associated with a CSI-RS, an RRC configuration, and/or the like.

As shown by reference number 420, the UE may identify an MPE event. In some aspects, the UE may identify the MPE event for one or more current beams based at least in part on the one or more beam metric values. In some aspects, the UE may identify the MPE event for a current beam based at least in part on at least one beam metric value, of the one or more beam metric values, associated with the first set of uplink resources.

As shown by reference number 430, the UE may determine to indicate an MPE event or beam switch. In some aspects, the UE may identify the current beam and a replacement beam for beam switching. In some aspects, the UE may identify a replacement beam for the current beam based at least in part on one or more beam metric values of the second set of uplink resources.

In some aspects, the UE may determine to indicate an MPE event or beam switch from the current beam to the replacement beam based at least in part on the one or more beam metric values for the current beam and one or more beam metric values of the replacement beam. In some aspects, the one or more beam metric values of the current beam and the one or more beam metric values of the replacement beam may be based at least in part on multiple measurements of one or more beam metrics. In other words, the one or more beam metric values of the current beam and the one or more beam metric values of the replacement beam may be based at least in part on average beam metric values of the current beam and the replacement beam, representative beam metric values of the current beam and the replacement beam, and/or the like. The one or more beam metric values may be considered multi-shot and/or periodic values.

In some aspects, the UE may determine to indicate an MPE event or beam switch from the current beam to the replacement beam based at least in part on an absolute condition. For example, the UE may determine to indicate an MPE event or beam switch from the current beam to the replacement beam based at least in part on one or more beam metric values of the current beam failing to satisfy a first threshold and the one or more beam metric values of the replacement beam satisfying a second threshold. In some aspects, the first threshold may be the same as the second threshold.

In some aspects, the UE may determine indicate an MPE event or to beam switch from the current beam to the replacement beam based at least in part on a relative condition. For example, the UE may determine to indicate an MPE event or beam switch from the current beam to the replacement beam based at least in part on one or more differences between the one or more beam metric values of the replacement beam and the one or more beam metric values of the current beam satisfying a threshold. In some aspects, the threshold may be 0 (zero) so that the UE will determine to beam switch based at least in part on the one or more beam metric values of the replacement beam being better than the one or more beam metric values of the current beam. In some aspects, the threshold may be relatively high, to reduce a number of beam switching events and/or to reduce computing, communication, and/or network resources that may be consumed by frequent beam switching.

In some aspects, the one or more beam metric values correspond to an uplink RSRP metric for each beam. A first value of an uplink RSRP metric may be better than a second value of the uplink RSRP metric based at least in part on the first value of the uplink RSRP metric being higher than the second value of the uplink RSRP metric.

In some aspects, the one or more beam metric values correspond to a virtual power header metric for each beam. A first value of a virtual power header metric may be better than a second value of the virtual power header metric based at least in part on the first value of the virtual power header metric being higher than the second value of the virtual power header metric.

In some aspects, the one or more beam metric values correspond to a P-MPR metric for each beam. A first value of a beam specific P-MPR metric may be better than a second value of the beam specific P-MPR metric based at least in part on the first value of the beam specific P-MPR metric being lower than the second value of the beam specific P-MPR metric.

As shown by reference number 440, the UE may transmit a report. In some aspects, the report may be based at least in part on the one or more beam metric values, the identification of the MPE event, and/or the like. In some aspects, the UE may transmit the report in a MAC-CE message, an uplink beam report, and/or the like.

In some aspects, the report may include at least one beam identification associated with the one or more beam metric values (e.g., a beam identification of each beam associated with the one or more beam metric values. In some aspects, the beam identification may include an uplink beam identification (e.g., an SRS resource indicator (SRI) for a PUSCH resource, a PUCCH spatial relation identification, an SRS spatial relation reference signal (SRS RS), and/or the like). In some aspects, the beam identification may include a spatial reference signal identification (e.g., a channel state information reference signal (CSI-RS) resource ID, a synchronization signal physical broadcast channel identification (SSB ID), and/or the like). In some aspects, the beam identification may include an uplink resource identifier (e.g., a PUCCH resource identification, an SRS resource identification, an SRS resource set identification, and/or the like).

In some aspects, as discussed further herein, the report may identify a current beam, a replacement beam, one or more beam metric values for the current beam, one or more beam metric values of the replacement beam, and/or the like. In this way, the UE may provide a proposal for beam switching and information to support the determination to beam switch. The base station may review the report and provide an acknowledgement to indicate that the proposal for beam switching is approved by the base station. The acknowledgement may indicate that the UE may begin a beam switching operation.

In some aspects, the report may include multiple current beams, multiple replacement beams (e.g., with each replacement beam corresponding to a current beam of the multiple current beams), beam metric values for the multiple current beams, beam metric values of the multiple replacement beams, and/or the like.

As shown by reference number 450, the UE may beam switch. In some aspects, the UE may configure one or more components of the UE to communicate using a new beam (e.g., the replacement beam indicated in the report).

As indicated above, FIG. 4 is provided as an example. Other examples may differ from what is described with respect to FIG. 4.

Figure 5:
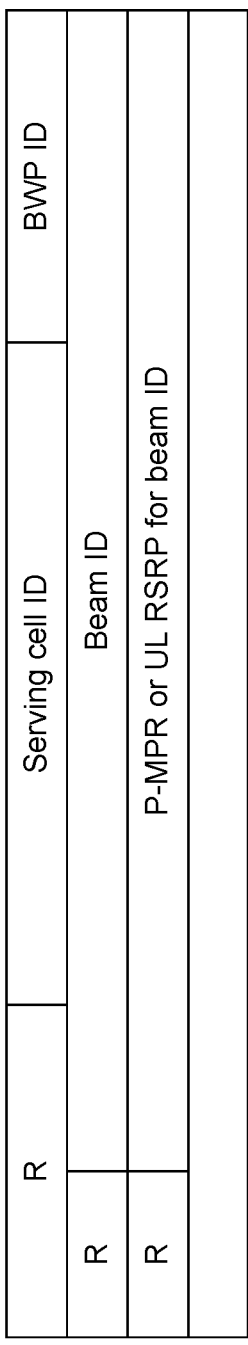
FIG. 5 is a diagram illustrating an example report for beam metric values, in accordance with various aspects of the present disclosure.

FIG. 5 is a diagram illustrating an example report 500 for beam metric values, in accordance with various aspects of the present disclosure.

As shown in FIG. 5, the report may include information including one or more reserve bits (e.g., "R" bits), a service cell identification, a bandwidth part identification, a beam identification, one or more beam metrics associated with the beam identification, and/or the like. In some aspects, the report may include the information for multiple current beams and/or multiple candidate beams.

As indicated above, FIG. 5 is provided as an example. Other examples may differ from what is described with respect to FIG. 5.

FIG. 6 is a diagram illustrating an example report 600 for beam metric values, in accordance with various aspects of the present disclosure. As shown in FIG. 6, the report may identify information for an uplink resource associated with a current beam and information for an uplink resource associated with a candidate beam (e.g., a proposed new beam or proposed new uplink resource, a candidate beam and/or a candidate downlink resource that the base station may choose, and/or the like).

As shown by reference number 610, the report may include an indication of an uplink resource associated with a current beam (e.g., a current uplink resource associated with the current beam) for which additional information is in the report. For example, the report shows an indication that additional information is provided within the report for a current uplink resource "C4."

As shown by reference number 620, the report may include an indication of an uplink resource associated with a candidate beam (e.g., an alternative uplink resource associated with the candidate beam) for which additional information is in the report. For example, the report shows an indication that additional information is provided within the report for a current uplink resource "C4."

In some aspects, the indication of the uplink resource associated with the current beam and the indication of the uplink resource associated with the candidate beam may indicate that the UE proposes beam switching from the current beam to the candidate beam (e.g., from a current uplink resource associated with the current beam to an alternative uplink resource associated with the candidate beam).

As shown by reference number 630, the report may include an indication of at least one beam metric value (e.g., a virtual power headroom metric value) for the uplink resource ("ci") associated with the current beam. In some aspects, the report may also include an indication of one or more metric types, associated with the at least one beam metric value for the uplink resource associated with the current beam, that are included in the report. In some aspects, the indication may indicate whether a beam specific $\tilde{P}_{cmax,f,c}$ (denoted as $P_{cmax,ci}$ in FIG. 6) value for the uplink resource associated with the current beam is reported, if only a virtual power headroom metric value is reported, whether a true power headroom metric or a virtual power headroom metric is reported, and/or the like. In some aspects (e.g., based at least in part on a configuration of the UE or the report), the "V" indicator may indicate whether beam specific $\tilde{P}_{cmax,f,c}$ is reported or not for the uplink resource, if the UE is configured to report a virtual power headroom metric value for the uplink resource and not a true power headroom metric value only. In some aspects, the "V" indicator may indicate whether a value corresponds to a virtual or a true PH if both are allowed and based at least in part on another value always corresponding to beam specific is $\tilde{P}_{cmax,f,c}$ for the uplink resource associated with the current beam.

As shown by reference number 640, the report may include an indication of at least one beam metric value (e.g., a virtual power headroom metric value) for the uplink resource associated with the candidate beam. In some aspects, the report may also include an indication of one or more metric types, associated with the at least one beam metric value for the uplink resource associated with the candidate beam, that are included in the report. In some aspects, the report may also include one or more indications for the at least one beam metric value for the uplink resource associated with the candidate beam (e.g., as described in relation to reference number 630).

As indicated above, FIG. 6 is provided as an example. Other examples may differ from what is described with respect to FIG. 6.

Figure 7:
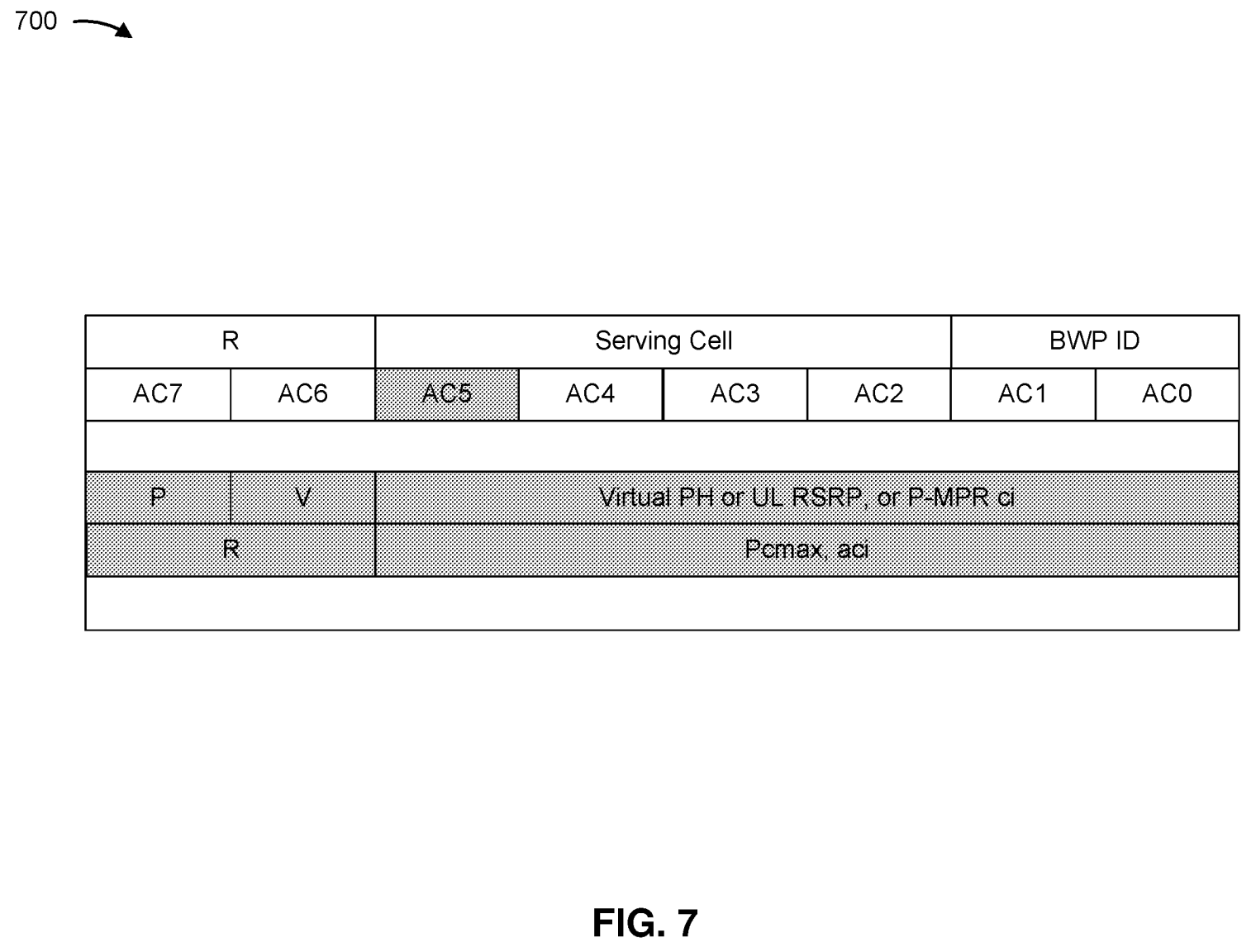

FIG. 7 is a diagram illustrating an example report 700 for beam metric values, in accordance with various aspects of the present disclosure. As shown in FIG. 7, the report may include information (e.g., as described in relation to reference numbers 620 and 640) for an uplink resource associated with a candidate beam, with or without information for an uplink resource associated with a current beam. In some aspects, the report may include information for multiple uplink resources associated with multiple candidate beams.

As indicated above, FIG. 7 is provided as an example. Other examples may differ from what is described with respect to FIG. 7.

Figure 8:
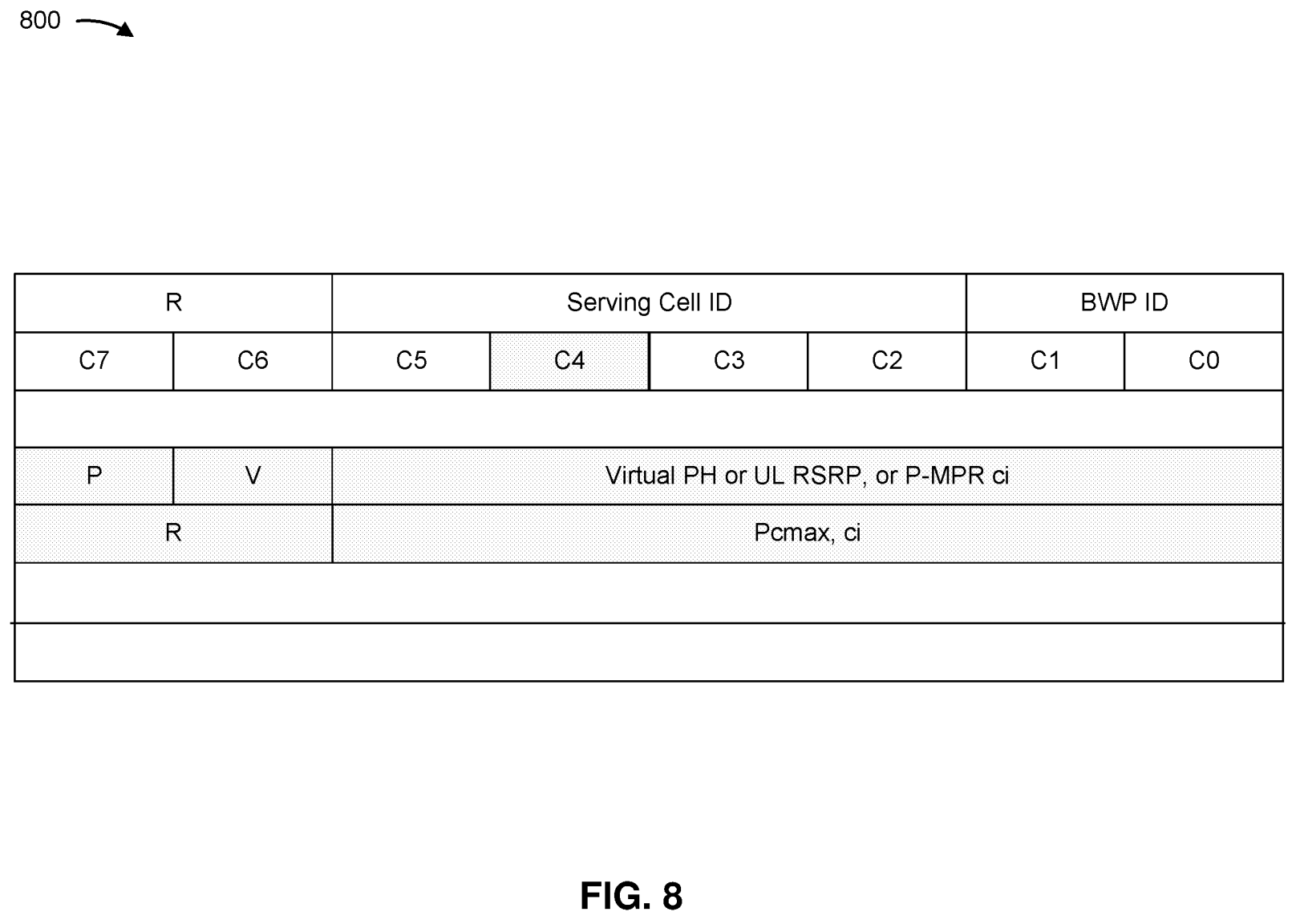

FIG. 8 is a diagram illustrating an example report 800 for beam metric values, in accordance with various aspects of the present disclosure. As shown in FIG. 8, the report may include information (e.g., as described in relation to reference numbers 610 and 630) for an uplink resource associated with a current beam, with or without information for an uplink resource associated with a candidate beam. In some aspects, the report may include information for multiple uplink resources associated with multiple candidate beams.

As indicated above, FIG. 8 is provided as an example. Other examples may differ from what is described with respect to FIG. 8.

FIG. 9 is a diagram illustrating an example 900 report for beam metric values, in accordance with various aspects of the present disclosure. As shown in FIG. 9, the report may include information (e.g., as described in relation to reference numbers 610 and 630) for an uplink resource associated with a current beam and with or without information for an uplink resource associated with a candidate beam. In some aspects, the report may include information for multiple uplink resources associated with multiple current beams.

In some aspects, the report may include a value for a beam P-MPR metric, a value of a maximum power available for a transmission via the uplink resource associated with the current beam. In some aspects, the report may include a value for a beam virtual power headroom metric, a value for an uplink RSRP metric, and or the like for the uplink resource associated with the current beam. In other words, the report may include three or more beam metric values for the uplink resource associated with the current beam. In some aspects, the report may include an indicator (e.g., "V2") to signal that a third beam metric value is included in the report.

Although example 900 shows the report including information for the uplink resource associated with a candidate beam, a report may additionally or alternatively include information for an uplink resource associated with a candidate beam As indicated above, FIG. 9 is provided as an example. Other examples may differ from what is described with respect to FIG. 9.

FIG. 10 is a diagram illustrating an example process 1000 performed, for example, by a UE, in accordance with various aspects of the present disclosure. Example process 1000 is an example where the UE (e.g., UE 120 and/or the like) performs operations associated with techniques for determining beam metrics for maximum permissible exposure reporting.

As shown in FIG. 10, in some aspects, process 1000 may include determining one or more beam metric values for one or more beams that are monitored by the UE, wherein the one or more beam metric values correspond to one or more of a beam P-MPR metric, a beam uplink RSRP metric, or a beam virtual power headroom metric (block 1010). For example, the UE (e.g., using receive processor 258, transmit processor 264, controller/processor 280, memory 282, and/or the like) may determine one or more beam metric values for one or more beams that are monitored by the UE, as described above. In some aspects, the one or more beam metric values correspond to one or more of a beam P-MPR metric, a beam uplink RSRP metric, or a beam virtual power headroom metric.

As further shown in FIG. 10, in some aspects, process 1000 may include transmitting a report based at least in part on the one or more beam metric values (block 1020). For example, the UE (e.g., using transmit processor 264, controller/processor 280, memory 282, and/or the like) may transmit a report based at least in part on the one or more beam metric values, as described above.

Process 1000 may include additional aspects, such as any single aspect or any combination of aspects described below and/or in connection with one or more other processes described elsewhere herein.

In a first aspect, the one or more beam metric values correspond to the uplink RSRP metric, and the uplink RSRP metric is based at least in part on a beam P-MPR metric.

In a second aspect, alone or in combination with the first aspect, the one or more beam metric values correspond to the beam virtual power headroom metric, and the beam virtual power headroom metric is based at least in part on a beam P-MPR metric.

In a third aspect, alone or in combination with one or more of the first and second aspects, process 1000 includes calculating a value for the beam virtual power headroom metric for a beam, of the one or more beams, based at least in part on an uplink resource, or an uplink resource configuration, associated with the beam.

In a fourth aspect, alone or in combination with one or more of the first through third aspects, the beam virtual power headroom metric for a beam is based at least in part on a difference between a maximum power available for a transmission via an uplink resource, or an uplink resource configuration, associated with the beam, and a current transmission power setting for a transmission via the uplink resource associated with the beam.

In a fifth aspect, alone or in combination with one or more of the first through fourth aspects, the maximum power available for the transmission via the uplink resource is based at least in part on a beam P-MPR metric for the beam.

In a sixth aspect, alone or in combination with one or more of the first through fifth aspects, the current transmission power setting for the transmission via the uplink resource associated with the beam is based at least in part on a set of power control parameters including one or more of pathloss, P0, alpha, or a reference target power.

In a seventh aspect, alone or in combination with one or more of the first through sixth aspects, the uplink resource comprises a PUCCH, a PUSCH, or an SRS.

In an eighth aspect, alone or in combination with one or more of the first through seventh aspects, the uplink resource configuration includes one or more of information relating to a pathloss reference signal, information relating to a power control loop, p0, alpha, or information relating to the beam.

In a ninth aspect, alone or in combination with one or more of the first through eighth aspects, the UE transmits the report in one or more of a MAC-CE message, or an uplink beam report.

In a tenth aspect, alone or in combination with one or more of the first through ninth aspects, the report comprises at least one beam identification associated with the one or more beam metric values.

In an eleventh aspect, alone or in combination with one or more of the first through tenth aspects, a beam identification of the at least one beam identification includes an uplink beam identification, a spatial reference signal identification, or an uplink resource identifier.

In a twelfth aspect, alone or in combination with one or more of the first through eleventh aspects, the report includes an uplink beam identification, a spatial reference signal identification, or an uplink resource identifier.

In a thirteenth aspect, alone or in combination with one or more of the first through twelfth aspects, the report includes one or more of an indication of an uplink resource associated with a current beam of the one or more beams, and at least one beam metric value, of the one or more beam metric values, for the uplink resource associated with the current beam.

In a fourteenth aspect, alone or in combination with one or more of the first through thirteenth aspects, the at least one beam metric value for the uplink resource associated with the current beam comprises a value for the beam virtual power headroom metric.

In a fifteenth aspect, alone or in combination with one or more of the first through fourteenth aspects, the report includes an indication of an uplink resource associated with a candidate beam of the one or more beams, and at least one beam metric value, of the one or more beam metric values, for the uplink resource associated with the candidate beam.

In a sixteenth aspect, alone or in combination with one or more of the first through fifteenth aspects, the report comprises an indication of metric types, associated with the at least one beam metric value for the uplink resource associated with the candidate beam, that are included in the report.

In a seventeenth aspect, alone or in combination with one or more of the first through sixteenth aspects, the at least one beam metric value for the uplink resource associated with the candidate beam comprises a value for the beam virtual power headroom metric.

In an eighteenth aspect, alone or in combination with one or more of the first through seventeenth aspects, the report includes an indication of an uplink resource associated with an additional current beam of the one or more beams, and at least one beam metric value, of the one or more beam metric values, for the uplink resource associated with the additional current beam.

In a nineteenth aspect, alone or in combination with one or more of the first through eighteenth aspects, the report includes an indication of an uplink resource associated with an additional candidate beam of the one or more beams, and at least one beam metric value, of the one or more beam metric values, for the uplink resource associated with the additional candidate beam.

In a twentieth aspect, alone or in combination with one or more of the first through nineteenth aspects, the at least one beam metric value for the uplink resource associated with the current beam includes a value for the beam P-MPR metric, a value of a maximum power available for a transmission via the uplink resource associated with the current beam, and one or more of a value for the beam virtual power headroom metric, or a value for the uplink RSRP metric.

In a twenty-first aspect, alone or in combination with one or more of the first through twentieth aspects, the report includes a value for the beam P-MPR metric, a value of a maximum power available for a transmission via the uplink resource associated with the current beam, and one or more of a value for the beam virtual power headroom metric, or a value for the uplink RSRP metric.

In a twenty-second aspect, alone or in combination with one or more of the first through twenty-first aspects, the report includes one or more of an indication of an uplink resource associated with a candidate beam of the one or more beams, and one or more beam metric values, of the one or more beam metric values, for the uplink resource associated with the candidate beam.

In a twenty-third aspect, alone or in combination with one or more of the first through twenty-second aspects, the at least one beam metric value for the uplink resource associated with the candidate beam includes a value for the beam virtual power headroom metric.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE, in accordance with various aspects of the present disclosure. Example process 1100 is an example where the UE (e.g., UE 120 and/or the like) performs operations associated with techniques for determining beam metrics for maximum permissible exposure reporting.

As shown in FIG. 11, in some aspects, process 1100 may include identifying an MPE event for a current beam based at least in part on one or more beam metric values for the current beam, wherein the one or more beam metric values correspond to one or more of a P-MPR metric, an uplink RSRP metric, or a virtual power headroom metric (block 1110). For example, the UE (e.g., using receive processor 258, transmit processor 264, controller/processor 280, memory 282, and/or the like) may identify an MPE event for a current beam based at least in part on one or more beam metric values for the current beam, as described above. In some aspects, the one or more beam metric values correspond to one or more of a P-MPR metric, an uplink RSRP metric, or a virtual power headroom metric.

As further shown in FIG. 11, in some aspects, process 1100 may include transmitting a report based at least in part on the identification of the MPE event (block 1120). For example, the UE (e.g., using transmit processor 264, controller/processor 280, memory 282, and/or the like) may transmit a report based at least in part on the identification of the MPE event, as described above.

Process 1100 may include additional aspects, such as any single aspect or any combination of aspects described below and/or in connection with one or more other processes described elsewhere herein.

In a first aspect, the UE is configured with a first set of uplink resources associated with one or more current beams, including the current beam, and the UE is configured with one or more of a second set of uplink resources for candidate beams, or a third set of uplink resources for reporting beam metrics.

In a second aspect, alone or in combination with the first aspect, the first set of uplink resources, the second set of uplink resources, and the third set of uplink resources include one or more of an SRS, a PUCCH, a PUSCH, or an RRC configuration.

In a third aspect, alone or in combination with one or more of the first and second aspects, process 1100 includes identifying the MPE event for the current beam based at least in part on at least one beam metric value, of the one or more beam metric values, associated with the first set of uplink resources.

In a fourth aspect, alone or in combination with one or more of the first through third aspects, process 1100 includes identifying, based at least in part on one or more beam metric values of the second set of uplink resources, a replacement beam for the current beam.

In a fifth aspect, alone or in combination with one or more of the first through fourth aspects, process 1100 includes determining to beam switch from the current beam to the replacement beam based at least in part on the one or more beam metric values for the current beam and one or more beam metric values of the replacement beam.

In a sixth aspect, alone or in combination with one or more of the first through fifth aspects, the one or more beam metric values of the current beam and the one or more beam metric values of the replacement beam are based at least in part on multiple measurements of one or more beam metrics.

In a seventh aspect, alone or in combination with one or more of the first through sixth aspects, the determination to beam switch from the current beam to the replacement beam is based at least in part on the one or more beam metric values of the current beam failing to satisfy a first threshold, and the one or more beam metric values of the replacement beam satisfying a second threshold.

In an eighth aspect, alone or in combination with one or more of the first through seventh aspects, the determination to beam switch from the current beam to the replacement beam is based at least in part on a difference between the one or more beam metric values of the replacement beam and the one or more beam metric values of the current beam satisfying a threshold.

In a ninth aspect, alone or in combination with one or more of the first through eighth aspects, process 1100 includes beam switching from the current beam to the replacement beam.

In a tenth aspect, alone or in combination with one or more of the first through ninth aspects, the report based at least in part on the identification of the MPE event identifies one or more of the current beam, the replacement beam, the one or more beam metric values for the current beam, or the one or more beam metric values of the replacement beam.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
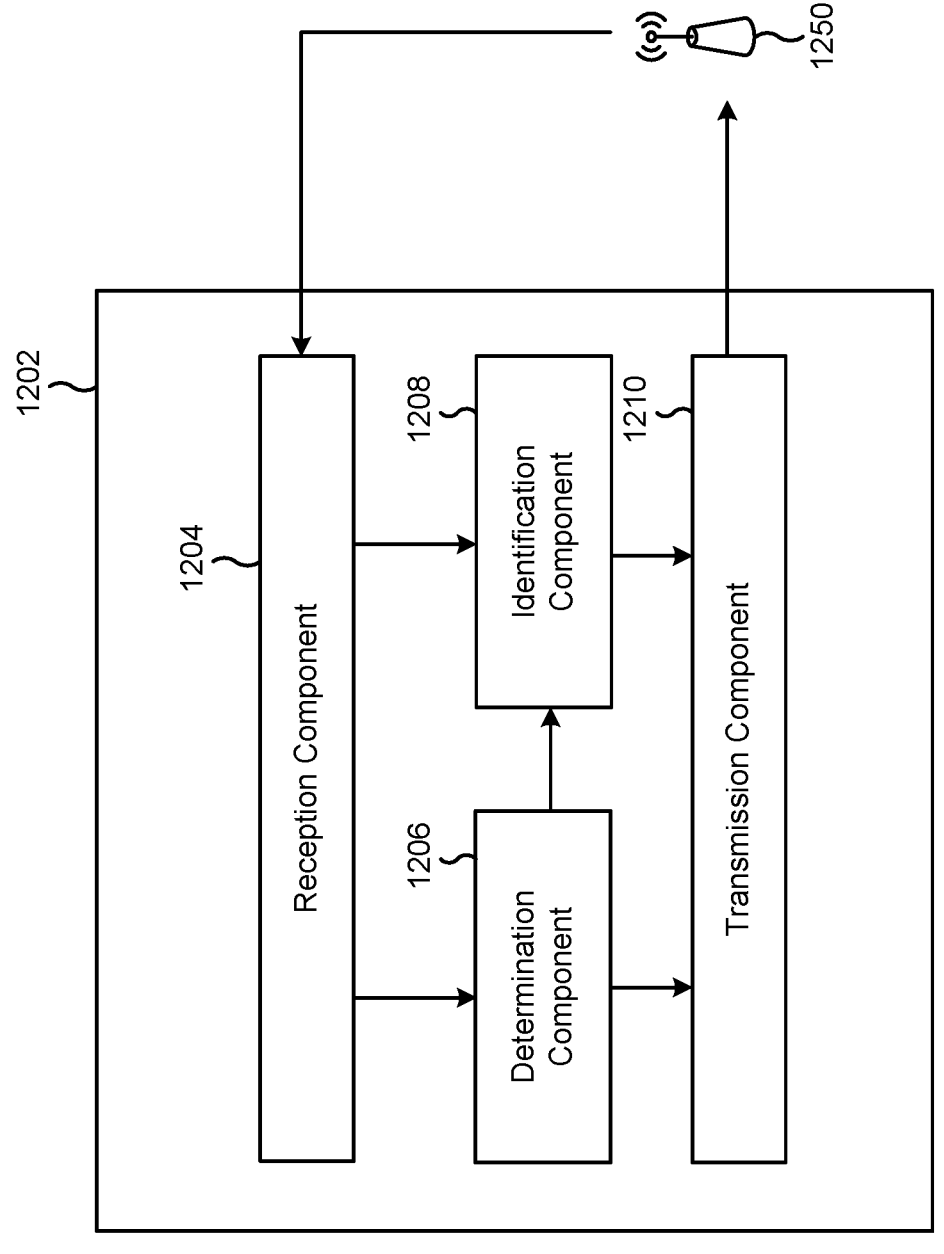
FIG. 12 is a conceptual data flow diagram illustrating a data flow between different components in an example apparatus, in accordance with various aspects of the present disclosure.

FIG. 12 is a conceptual data flow diagram 1200 illustrating a data flow between different components in an example apparatus 1202. The apparatus 1202 may be a UE (e.g., UE 120). In some aspects, the apparatus 1202 includes a reception component 1204, a determination component 1206, an identification component 1208, an initiation component 1210, and/or a transmission component 1212.

In some aspects, the apparatus may communicate with a base station via one or more beams using the reception component 1204 and the transmission component 1212. The apparatus may use the determination component 1206 to determine one or more beam metric values (e.g., a beam P-MPR metric value, a beam downlink RSRP metric value, a beam virtual power headroom metric, and/or the like) for one or more beams that are monitored by the apparatus. The apparatus may use the identification component 1208 to identify an MPE event for a current beam based at least in part on the one or more beam metric values. The apparatus may transmit a report based at least in part on the one or more beam metric values, the identification of the MPE event, and/or the like.

The apparatus may include additional components that perform each of the blocks of the algorithm in the afore-mentioned process 1000 of FIG. 10, process 1100 of FIG. 11, and/or the like. Each block in the aforementioned process 1000 of FIG. 10, process 1100 of FIG. 11, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of components (e.g., one or more components) shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining, based at least in part on an uplink resource, or an uplink resource configuration, associated with one or more beams, one or more beam metric values for the one or more beams that are monitored by the UE, wherein the one or more beam metric values are beam specific for each beam of the one or more beams and correspond to one or more of a beam power management maximum power reduction (P-MPR) metric, a beam uplink reference signal receive power (RSRP) metric, or a beam virtual power headroom metric; and
   transmitting a report based at least in part on the one or more beam metric values, wherein the report comprises an indication of the uplink resource associated with the each beam of the one or more beams, and at least one beam metric value, of the one or more beam metric values, for the uplink resource associated with the each beam of the one or more beams.

2. The method of claim 1,
   wherein the one or more beam metric values correspond to the beam uplink RSRP metric, and
      wherein the beam uplink RSRP metric is based at least in part on a beam P-MPR metric.

3. The method of claim 1,
   wherein the one or more beam metric values correspond to the beam virtual power headroom metric, and
      wherein the beam virtual power headroom metric is based at least in part on a beam P-MPR metric.

4. The method of claim 3, further comprising:
   calculating a value for the beam virtual power headroom metric for a beam, of the one or more beams, based at least in part on the uplink resource, or the uplink resource configuration, associated with the beam.

5. The method of claim 1,
   wherein the beam virtual power headroom metric for a beam is based at least in part on a difference between a maximum power available for a transmission via an uplink resource, or an uplink resource configuration, associated with the beam and a current transmission power setting for a transmission via the uplink resource associated with the beam.

6. The method of claim 5,
wherein the maximum power available for the transmission via the uplink resource is based at least in part on a beam P-MPR metric for the beam.

7. The method of claim 5,
wherein the current transmission power setting for the transmission via the uplink resource associated with the beam is based at least in part on a set of power control parameters comprising one or more of:
pathloss,
P0,
alpha, or
a reference target power.

8. The method of claim 5,
wherein the uplink resource comprises a physical uplink control channel, a physical uplink shared channel, or a sounding reference signal.

9. The method of claim 5,
wherein the uplink resource configuration comprises one or more of:
information relating to a pathloss reference signal,
information relating to a power control loop,
p0,
alpha, or
information relating to the beam.

10. The method of claim 1,
wherein the UE transmits the report in one or more of:
a medium access control control element message, or
an uplink beam report.

11. The method of claim 1,
wherein the report comprises at least one beam identification associated with the one or more beam metric values.

12. The method of claim 11,
wherein a beam identification of the at least one beam identification comprises:
an uplink beam identification,
a spatial reference signal identification, or
an uplink resource identifier.

13. The method of claim 12, wherein the uplink resource identifier comprises one or more of a physical uplink control channel (PUCCH) identifier, a sounding reference signal (SRS) identifier, or a SRS resource set identifier.

14. The method of claim 1,
wherein the report comprises one or more of:
an indication of one or more metric types, associated with the at least one beam metric value for the uplink resource associated with the current beam, that are included in the report.

15. The method of claim 14,
wherein the at least one beam metric value for the uplink resource associated with the current beam comprises a value for the beam virtual power headroom metric.

16. The method of claim 1,
wherein the report comprises:
an indication of an uplink resource associated with a candidate beam of the one or more beams, and
at least one beam metric value, of the one or more beam metric values, for the uplink resource associated with the candidate beam.

17. The method of claim 16,
wherein the report comprises:
an indication of metric types, associated with the at least one beam metric value for the uplink resource associated with the candidate beam, that are included in the report.

18. The method of claim 16,
wherein the at least one beam metric value for the uplink resource associated with the candidate beam comprises a value for the beam virtual power headroom metric.

19. The method of claim 16,
wherein the report comprises:
an indication of an uplink resource associated with an additional current beam of the one or more beams, and
at least one beam metric value, of the one or more beam metric values, for the uplink resource associated with the additional current beam.

20. The method of claim 1,
wherein the report comprises:
an indication of an uplink resource associated with an additional candidate beam of the one or more beams, and
at least one beam metric value, of the one or more beam metric values, for the uplink resource associated with the additional candidate beam.

21. The method of claim 1,
wherein the at least one beam metric value for the uplink resource associated with the current beam comprises:
a value for the beam P-MPR metric,
a value of a maximum power available for a transmission via the uplink resource associated with the current beam, and
one or more of:
a value for the beam virtual power headroom metric, or
a value for the beam uplink RSRP metric.

22. The method of claim 1,
wherein the report comprises:
an indication of an uplink resource associated with a candidate beam of the one or more beams, and
one or more beam metric values, of the one or more beam metric values, for the uplink resource associated with the candidate beam.

23. The method of claim 22,
wherein the report comprises one or more of:
an indication of one or more metric types, associated with at least one beam metric value of the one or more beam metric values, that are included in the report.

24. A method of wireless communication performed by a user equipment (UE), comprising:
identifying a maximum permissible exposure (MPE) event for a current beam based at least in part on one or more beam metric values for the current beam, wherein the UE is configured with a first set of uplink resources associated with one or more current beams including the current beam,
wherein the one or more beam metric values are beam specific for each of the one or more beams and correspond to one or more of a power management maximum power reduction (P-MPR) metric, an uplink reference signal receive power (RSRP) metric, or a virtual power headroom metric; and
transmitting a report based at least in part on the identification of the MPE event, wherein the report based at least in part on the identification of the MPE event identifies one or more of the current beam, the replacement beam, the one or more beam metric values for the current beam, or the one or more beam metric values of the replacement beam.

25. The method of claim 24,
wherein the UE is configured with one or more of:
   a second set of uplink resources for candidate beams, or
   a third set of uplink resources for reporting beam metrics.

26. The method of claim 25, comprising:
identifying the MPE event for the current beam based at least in part on at least one beam metric value, of the one or more beam metric values, associated with the first set of uplink resources.

27. The method of claim 25, comprising:
identifying, based at least in part on one or more beam metric values of the second set of uplink resources, a replacement beam for the current beam.

28. The method of claim 27, comprising:
determining to beam switch from the current beam to the replacement beam based at least in part on the one or more beam metric values for the current beam and one or more beam metric values of the replacement beam.

29. The method of claim 28,
wherein the one or more beam metric values of the current beam and the one or more beam metric values of the replacement beam are based at least in part on multiple measurements of one or more beam metrics.

30. The method of claim 28,
wherein the determination to beam switch from the current beam to the replacement beam is based at least in part on:
   the one or more beam metric values of the current beam failing to satisfy a first threshold, and
   the one or more beam metric values of the replacement beam satisfying a second threshold.

31. The method of claim 28,
wherein the determination to beam switch from the current beam to the replacement beam is based at least in part on:
   a difference between the one or more beam metric values of the replacement beam and the one or more beam metric values of the current beam satisfying a threshold.

32. The method of claim 28, comprising:
beam switching from the current beam to the replacement beam.

33. The method of claim 28, wherein the first threshold is the same as the second threshold.

34. A user equipment (UE) for wireless communication, comprising:
   one or more memories; and
   one or more processors coupled to the one or more memories, the one or more processors configured to:
      determine, based at least in part on an uplink resource, or an uplink resource configuration, associated with one or more beams, one or more beam metric values for the one or more beams that are monitored by the UE,
         wherein the one or more beam metric values are beam specific for each beam of the one or more beams and correspond to one or more of a beam power management maximum power reduction (P-MPR) metric, a beam uplink reference signal receive power (RSRP) metric, or a beam virtual power headroom metric; and
      transmit a report based at least in part on the one or more beam metric values, wherein the report comprises an indication of the uplink resource associated with the each beam of the one or more beams, and at least one beam metric value, of the one or more beam metric values, for the uplink resource associated with the each beam of the one or more beams.

35. A user equipment (UE) for wireless communication, comprising:
   one or more memories; and
   one or more processors coupled to the one or more memories, the one or more processors configured to:
      identify a maximum permissible exposure (MPE) event for a current beam based at least in part on one or more beam metric values for the current beam, based at least in part on an uplink resource, or an uplink resource configuration, associated with one or more beams,
         wherein the one or more beam metric values are beam specific for each of the one or more beams and correspond to one or more of a power management maximum power reduction (P-MPR) metric, an uplink reference signal receive power (RSRP) metric, or a virtual power headroom metric; and
      transmit a report based at least in part on the identification of the MPE event, wherein the report based at least in part on the identification of the MPE event identifies one or more of the current beam, the replacement beam, the one or more beam metric values for the current beam, or the one or more beam metric values of the replacement beam.

* * * * *